US007979981B2

(12) United States Patent
Bertrand

(10) Patent No.: US 7,979,981 B2
(45) Date of Patent: Jul. 19, 2011

(54) AUTOMATED CONSTRUCTION SYSTEM

(75) Inventor: Ben A. Bertrand, Edmonton (CA)

(73) Assignee: Innovequity Inc., Edmonton, Alberta (CA)

( * ) Notice: Subject to any disclaimer, the term of this patent is extended or adjusted under 35 U.S.C. 154(b) by 1370 days.

(21) Appl. No.: 11/419,135

(22) Filed: May 18, 2006

(65) Prior Publication Data

US 2006/0283105 A1 Dec. 21, 2006

Related U.S. Application Data

(60) Provisional application No. 60/683,814, filed on May 23, 2005, provisional application No. 60/739,410, filed on Nov. 25, 2005.

(51) Int. Cl.
*B23P 19/00* (2006.01)

(52) U.S. Cl. ................ 29/791; 29/771; 29/783; 52/143; 52/221.1; 52/745.19; 52/745.2

(58) Field of Classification Search .................... 29/771, 29/783, 791; 52/745.2, 745.19, 220.1, 143, 52/79.5, 66, 69

See application file for complete search history.

(56) References Cited

U.S. PATENT DOCUMENTS 3,221,464 A 12/1965 Miller
3,246,058 A 4/1966 Voelker
3,354,596 A 11/1967 Schafer
3,389,528 A 6/1968 Moehlenpah
3,593,481 A 7/1971 Miculin
3,662,502 A 5/1972 Wright
3,733,235 A 5/1973 Ligt et al.
3,771,274 A 11/1973 Vaughan
3,807,100 A 4/1974 Kuss
3,847,521 A 11/1974 Stickler, Jr.
3,914,154 A 10/1975 Pfeiffer
3,939,548 A 2/1976 Jureit et al.
3,969,862 A 7/1976 Kuss
3,982,732 A 9/1976 Pender
3,989,235 A 11/1976 Husges
4,005,556 A 2/1977 Tuomi
4,017,932 A 4/1977 Lotto et al.
4,115,975 A 9/1978 Bliss
4,147,009 A 4/1979 Watry
4,207,042 A 6/1980 Linetsky
4,286,934 A 9/1981 Linetsky
4,428,791 A 1/1984 Reinke
4,450,617 A 5/1984 Dillon
4,557,097 A 12/1985 Mikulas, Jr. et al.
4,559,748 A 12/1985 Ressel
4,606,715 A * 8/1986 Larson .......................... 425/110
4,662,146 A 5/1987 Parry
4,709,519 A 12/1987 Liefer et al.

(Continued)

FOREIGN PATENT DOCUMENTS

EP 0093224 11/1983

(Continued)

*Primary Examiner* — Rick K Chang

(74) *Attorney, Agent, or Firm* — Bennett Jones LLP

(57) ABSTRACT

An automated method of building construction utilizes a horizontal force to extrude a structural member formed from a plurality of elongate joists, upper panels, and lower panels. An apparatus for automating building construction includes an upper panel bay and feeder, a joist array and feeder, and a lower panel bay and feeder. The machine positions each joist and upper and lower panels into an installation position where fastening means forms the structural member, which is advanced out of the apparatus.

5 Claims, 24 Drawing Sheets

U.S. PATENT DOCUMENTS

| | | | |
|---|---|---|---|
| 4,711,062 | A | 12/1987 | Gwilliam et al. |
| 4,942,701 | A | 7/1990 | Jones et al. |
| 5,085,018 | A | 2/1992 | Kitamura et al. |
| 5,092,028 | A | 3/1992 | Harnden |
| 5,161,345 | A | 11/1992 | Sobjack et al. |
| 5,163,262 | A | 11/1992 | Adams |
| 5,293,725 | A | 3/1994 | Matticks et al. |
| 5,371,993 | A | 12/1994 | Saito |
| 5,425,214 | A | 6/1995 | Truelove et al. |
| 5,588,274 | A | 12/1996 | Lange |
| 5,890,341 | A * | 4/1999 | Bridges et al. ............... 52/745.2 |
| 6,000,192 | A | 12/1999 | Cohen et al. |
| 6,076,770 | A | 6/2000 | Nygren et al. |
| 6,618,025 | B2 | 9/2003 | Harless |
| 6,739,098 | B2 | 5/2004 | Hoberman |
| 6,820,377 | B2 | 11/2004 | Fumez |
| 6,842,981 | B2 | 1/2005 | Kennelly et al. |
| 2002/0195004 | A1 | 12/2002 | Mead |
| 2003/0188495 | A1 | 10/2003 | Taylor et al. |

FOREIGN PATENT DOCUMENTS

| | | |
|---|---|---|
| EP | 0498778 | 8/1992 |
| JP | 2001336246 | 12/2001 |

* cited by examiner

AUTOMATED CONSTRUCTION SYSTEM

CROSS REFERENCE TO RELATED APPLICATIONS

This application claims the priority benefit of U.S. Provisional Application Nos. 60/683,814 filed on May 23, 2005 and 60/739,410 filed on Nov. 22, 2005, the contents of which are incorporate herein by reference.

FIELD OF THE INVENTION

The present invention relates to a method and apparatus for constructing a building, which is automated to a large degree.

BACKGROUND

The world has huge hydrocarbon reserves in the form of heavy oil. As used herein, Conventional frame building construction relies on labour intensive manual work. Once an appropriate foundation is laid, workmen install joists and flooring, erect wall frames, add wall sheathing on both the exterior and interior surfaces, add roof trusses and roof sheathing, all as is well-known in the art. Furthermore, plumbing and wiring require drilling holes in framing members and joists to route the wires and pipes to appropriate locations. A large crew of skilled tradesmen are required for such assembly.

There is a need in the art for automated methods of construction, which employ an apparatus for such automated methods of construction.

SUMMARY OF THE INVENTION

In one aspect, the invention may comprise a method of constructing a building, comprising the steps of:

(a) providing a plurality of vertical joists, arrayed horizontally, each joist having an upper edge and a lower edge, a plurality of horizontal upper panels, vertically stacked, above the arrayed joists, and a plurality of horizontal lower panels, vertically stacked, below the arrayed joists, wherein each of the upper and lower panels has a leading edge and a trailing edge;

(b) positioning a first joist in the joist array in an installation position;

(c) positioning a first upper panel and a first lower panel such that their leading edges aligns with the first joist in the installation position;

(d) fastening the first upper panel to the upper edge of a first joist, and fastening the first lower panel to the lower edge of the first joist;

(e) applying a horizontal force to the assembly created in steps (a) through (d) until the first joist is spaced apart from the installation position by a predetermined distance;

(f) positioning a second joist and the trailing edges of the first upper and first lower panel into the installation position;

(g) fastening the trailing edge of the first upper panel to the upper edge of the second joist, and fastening the trailing edge of the first lower panel to the lower edge of the second joist;

(h) positioning the leading edge of the next upper panel and the next lower panel in the installation position, and attaching the said leading edges to the second joist, abutted against the trailing edges of the first upper and lower panels respectively (i) positioning the next joist in the installation position (j) fastening successive upper panels and successive lower panels to successive joists by repeating steps (b) through (k), to create a structural member; and (k) positioning the structural member in a desired position.

In one embodiment, the horizontal force is applied in a continuous manner. In another embodiment, the horizontal force is applied in an intermittent manner. Preferably, the horizontal force is interrupted as each successive joist reaches a predetermined distance from the installation position, where the next joist is positioned, thereby allowing strong and stable attachment of the upper and lower panels to each joist. In one embodiment, the horizontal force is a pull force, applied to the first joist. In another embodiment, the horizontal force is a push force.

In another aspect, the invention comprises an apparatus for automating building construction comprising:

(a) a joist feeder including a joist bay for holding a plurality of vertical joists, horizontally arrayed, and means for forcing the plurality of joists horizontally;

(b) an upper panel feeder, positioned above the joist feeder, comprising a panel bay for holding a plurality of horizontal panels, vertically arrayed;

(c) a lower panel feeder, positioned below the joist feeder, comprising a panel bay for holding a plurality of horizontal panels, vertically arrayed, and including means for forcing the lower panel array upwards, (d) pull means for pulling a first joist away from the joist feeder;

(e) fastening means for fastening the upper panels to the joists, and fastening means for fastening the lower panels to the joists;

(f) alignment means for positioning each successive joist in alignment with the panel fastening means; and (g) means for aligning each successive upper panel and each successive lower panel with the joist aligned with the fastening means.

BRIEF DESCRIPTION OF THE DRAWINGS

The invention will now be described by way of an exemplary embodiment with reference to the accompanying simplified, diagrammatic, not-to-scale drawings.

DETAILED DESCRIPTION OF PREFERRED EMBODIMENTS

The present invention provides for an automated method of construction, and an apparatus for implementing such methods. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

In the following description, the terms "horizontal" and "vertical" are used with their normal meanings. However, one skilled in the art will recognize that embodiments of the invention may vary in this regard. What is important is the relative orientation of the various components and forces described below. The term "front" shall refer to the elongate side of the framing machine (1) from which the structural member (10) being assembled is produced. The "rear" side is opposite the front side.

In one embodiment, the automated construction method of the present invention and the framing machine (1) produces a planar structural member (10) in a process analogous to an extrusion of building material. A horizontal force is applied to elements used to assemble the structural member, as it is being assembled. In one embodiment, a pull force is used to elongate the structural member, rather than a push force. In another embodiment, a push force may be used. The produced structural member (10) may be used in an exterior wall, interior wall, a floor, an upper floor or a roof.

The framing machine may be suspended from construction cranes, or otherwise positioned with suitable means. In one embodiment, the framing machine may be trailer mounted. The trailer (not shown) may have levelling means and be self powered, so as to be manoeuvrable. Each wheel at each corner may be powered and pivotable so that the trailer and framing machine may be precisely positioned as required. Preferably, each wheel has a height adjustment capability which permits precise levelling of the entire framing machine.

Figure 1:
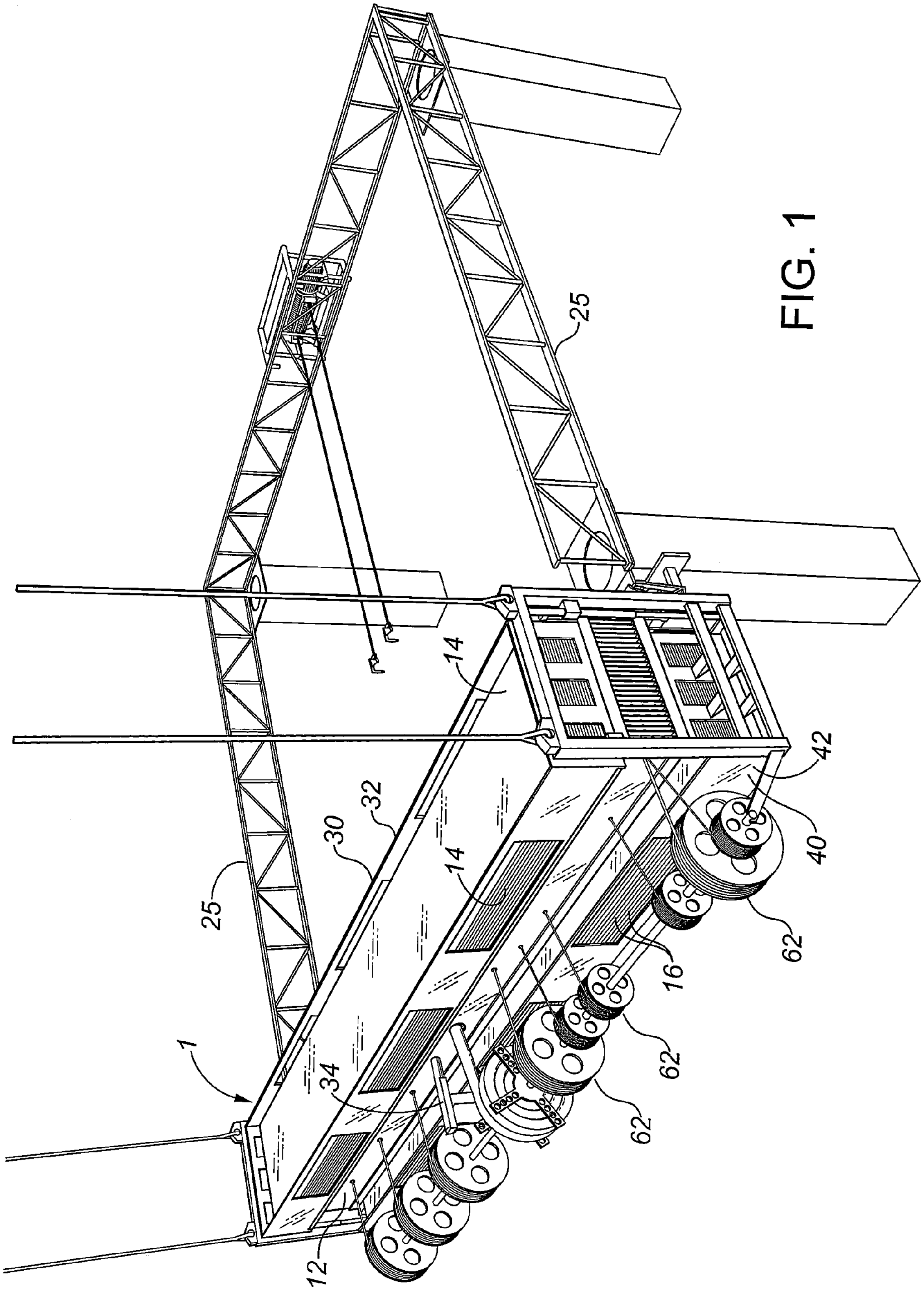
FIG. 1 is a view of one embodiment of the present invention.

The planar structural member (10) comprises a plurality of vertical joists or trusses (12), which separate and support planar sheathing on at least one of, and preferably both top (14) and bottom (16) as may be generally seen in FIG. 1. The framing machine (1) which produces the structural member (10) includes a joist feeder (22) including a joist bay (24) for holding a plurality of horizontally arrayed vertical joists (12). Support rails (25) support the arrayed joists. A piston (26) or other mechanical means is provided within the joist bay for displacing the joists horizontally within the joist bay.

The joists and joist bay (24) are a length which preferably is a multiple of a board or panel length. If standard 4'×8' panels are used, the joists may be 8, 16 or 24 feet. Longer joists are of course possible and result in structural members (10) extending passed the boarding.

Above the joist feeder (22) is an upper panel feeder (30) comprising a panel bay (32) for holding a plurality of vertically stacked horizontal panels, which form the upper sheathing (14). The upper panel feeder (30) may rely on gravity to feed the panels downwards, or the upper panel feed may be mechanized in any suitable fashion. An upper panel actuator (34) pushes the bottommost upper panel towards the front of the apparatus. The upper panel actuator (34) comprises a small hydraulic ram and a push attachment (35) which is generally the thickness of a single panel or less. Each upper panel and each lower panel has a leading edge which faces the front (F) of the framing machine, and a trailing edge which faces the rear (R) of the framing machine. The upper panels may rest directly on the joist array, in which case a moveable support may be introduced from the rear of the upper panel bay as the joist array is moved outwards.

Below the joist feeder (22) is a lower panel feeder (40), comprising a panel bay (42) for holding a plurality of vertically stacked horizontal panels (16). The lower panel feeder includes a lift mechanism (44) comprising support beams connected to hydraulic rams (46). Alternative lift mechanism may include a scissors platform or other mechanical means for forcing the lower panel array upwards. A lower panel actuator (48) comprises a small hydraulic ram and a push attachment (49) which is generally the thickness of a single panel or less.

Figure 16:
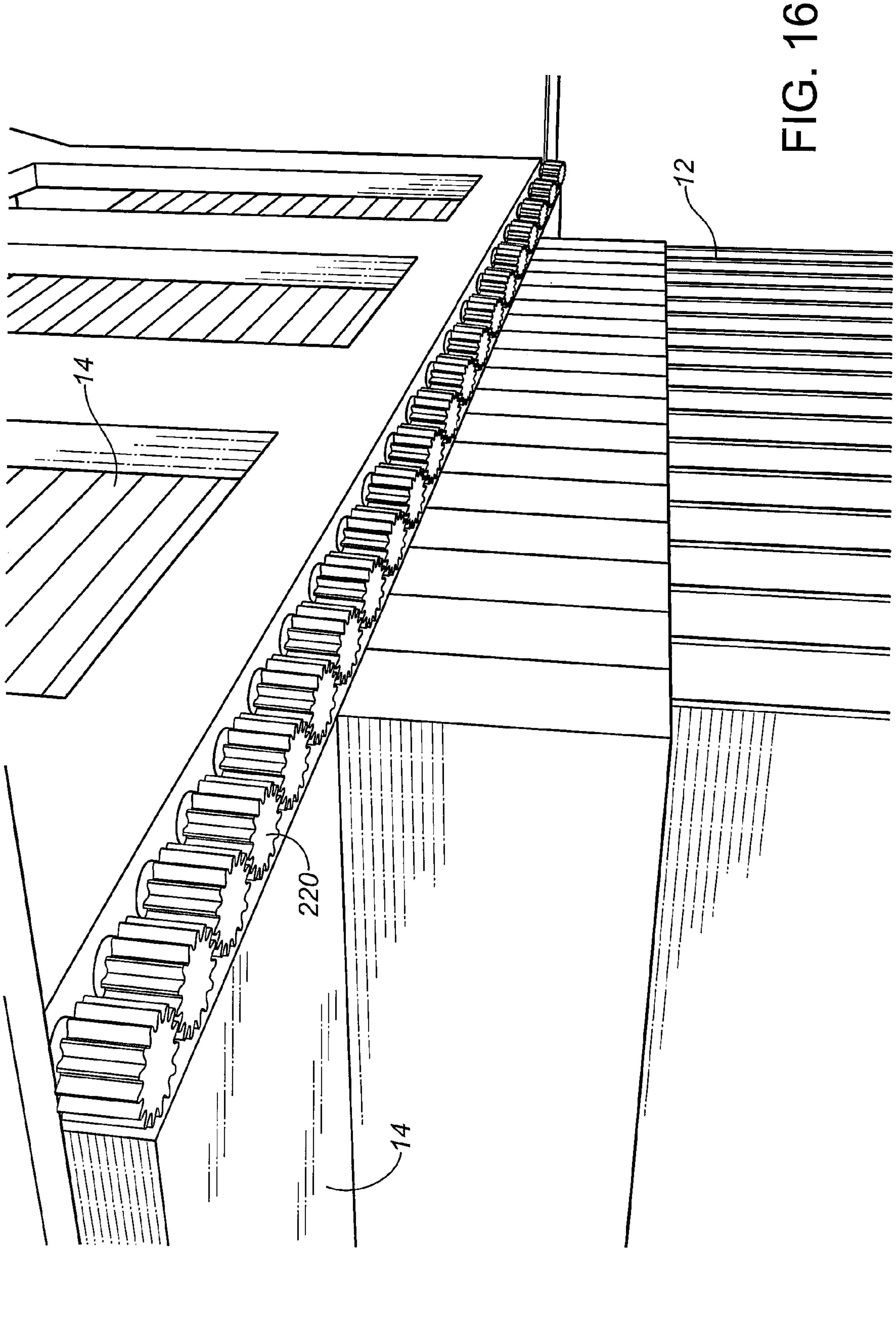
FIG. 16 shows an alternative upper or lower panel feed mechanism.

In one embodiment, the upper and lower panel actuators (34, 48) may comprise of a plurality of rollers with or without teeth (220), as shown in FIG. 16, or a belt may be actuated to push the panels outwards by the action of the teeth or belt surface on the ends of the panels.

Figure 2:
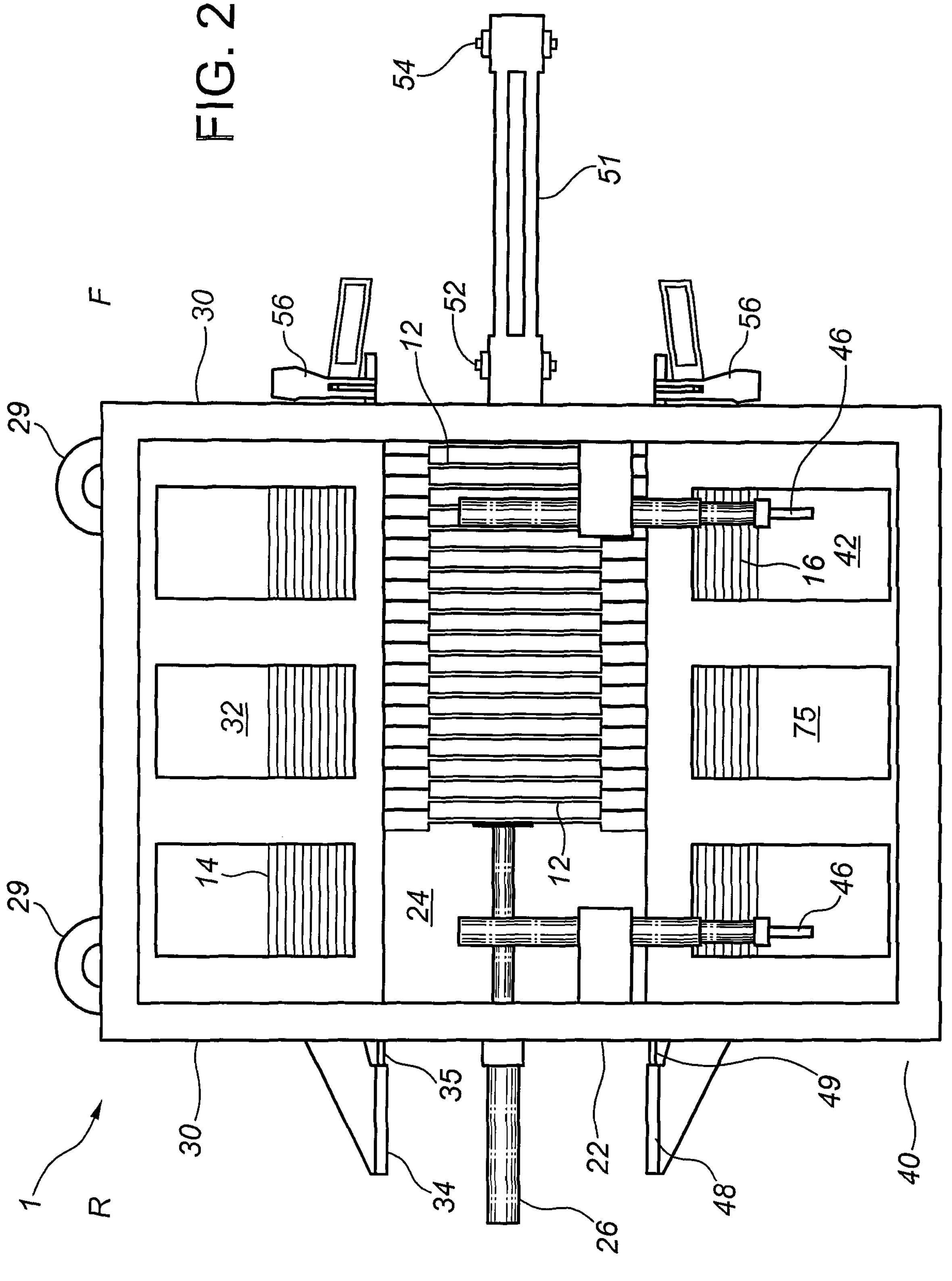
FIG. 2 is a side view of a framing machine of the present invention.
Figure 2A:
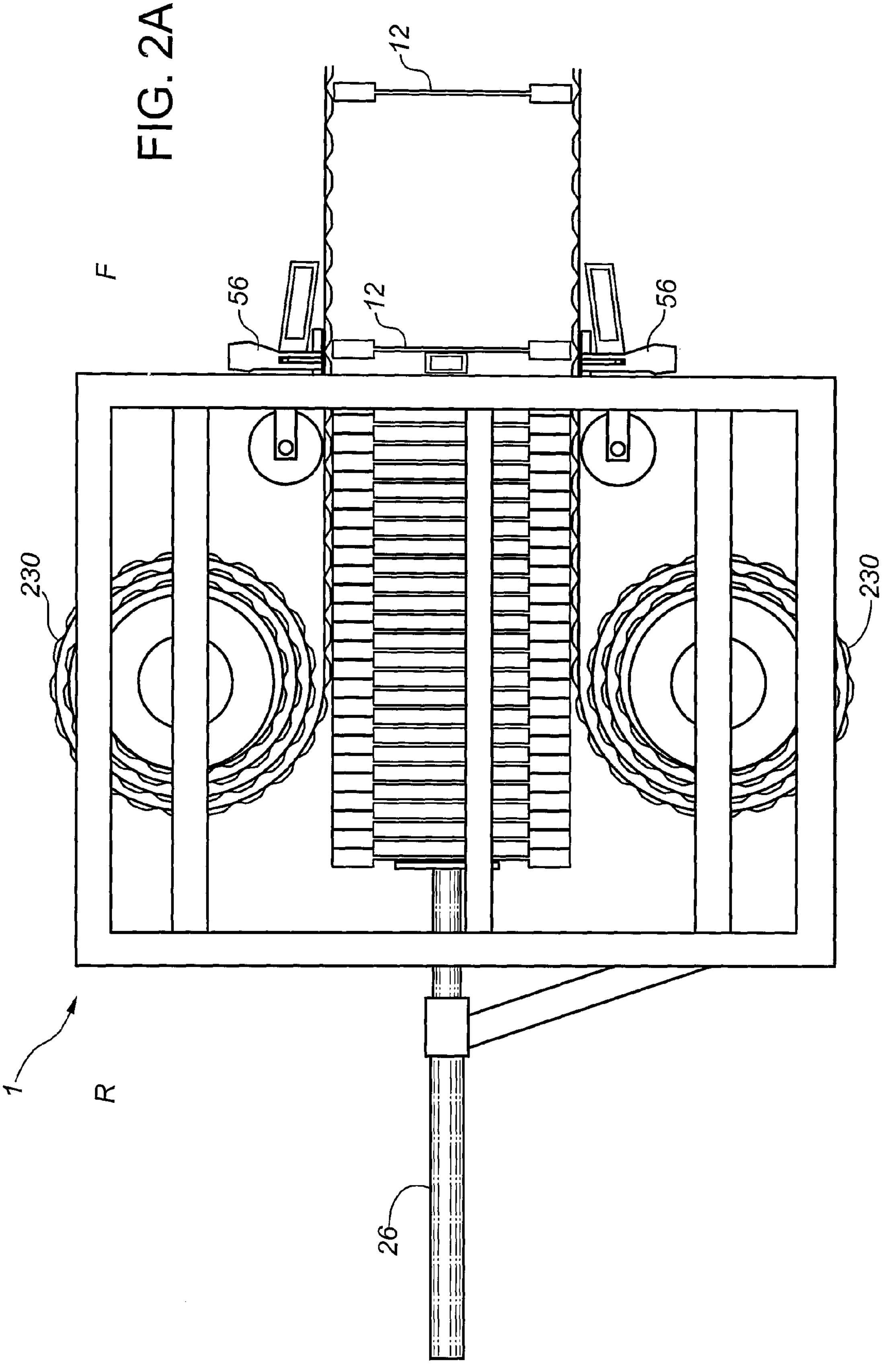
FIG. 2A is a side view of an alternative embodiment.

In another embodiment, the plurality of upper and lower panels may be replaced with a continuous sheet of material, which may be applied from a roll (230) of the material, as is illustrated in FIG. 2A.

Figure 3A:
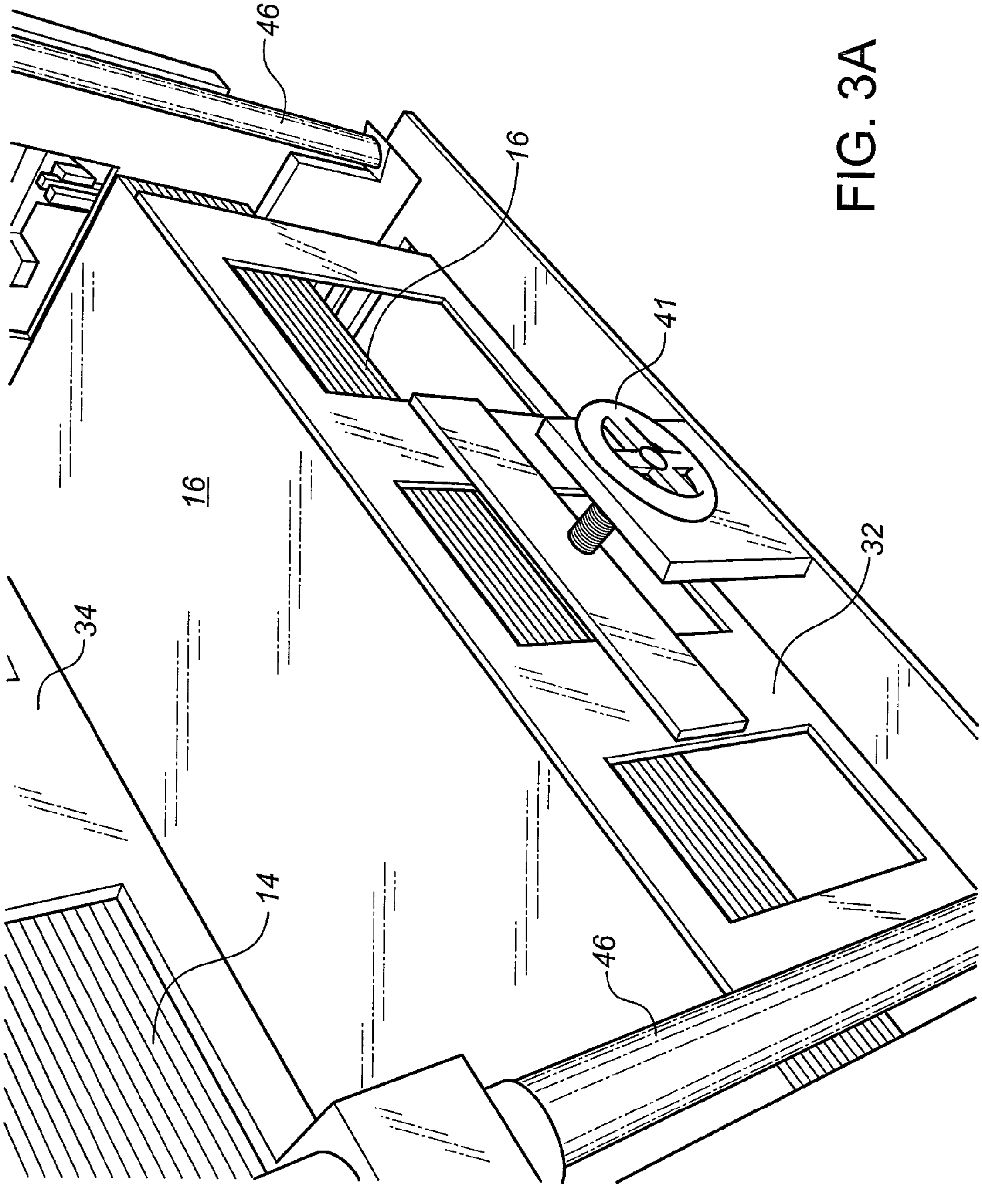
FIGS. 3A and 3B are views of a loading clamp of the present invention.
Figure 3B:
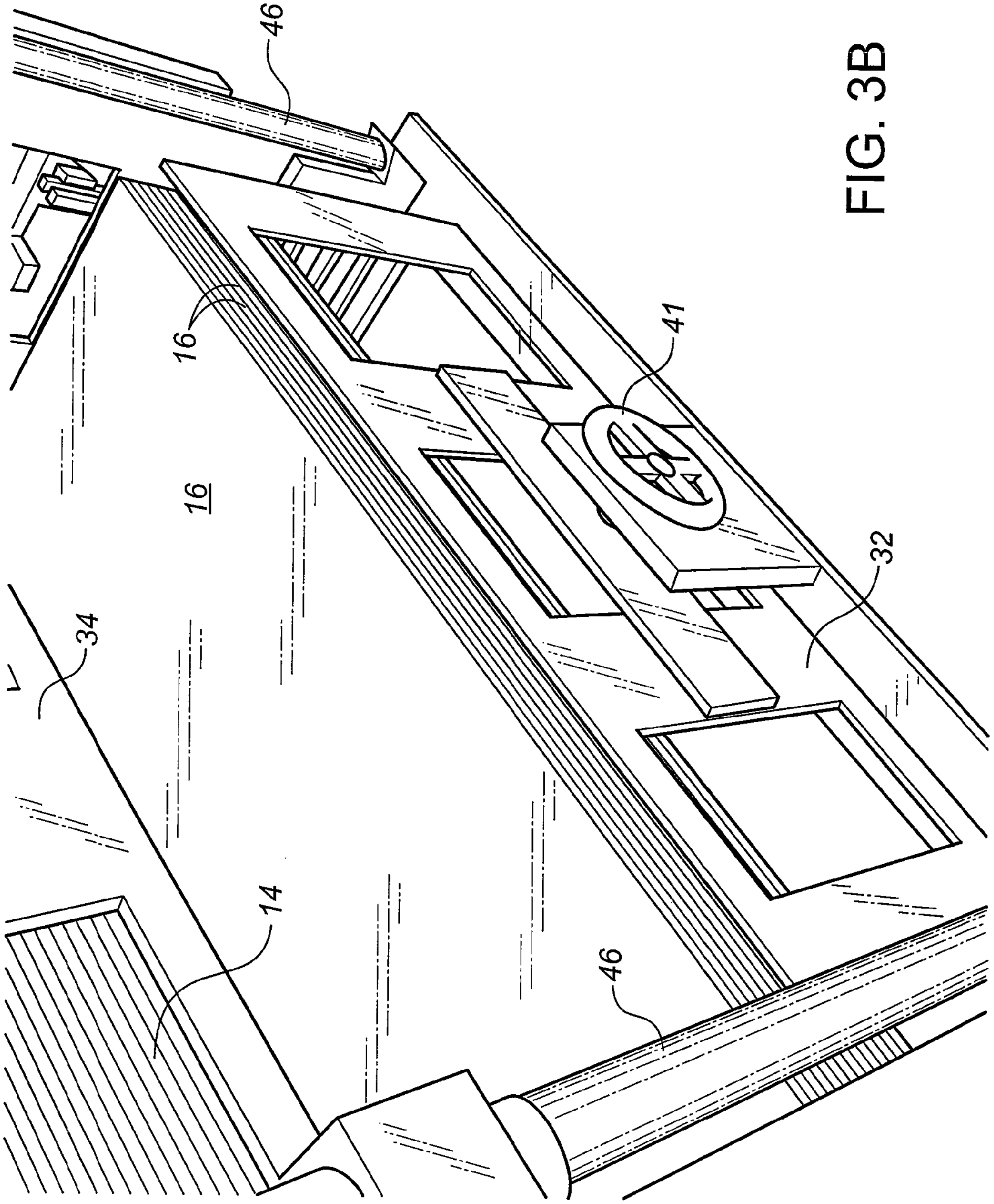

In one embodiment, both lower panel bay (32) and upper panel bay (42) may have an adjustable length by means of loading clamps (41), the operation of which is shown in FIGS. 3A and 3B. It is important that the panels are aligned, which may be accomplished by sizing the panel bays with a close tolerance to the size of the panels. However, if the tolerance is too small, it may prove difficult to load the bays with the panels, or friction may hamper movement of the panels within the bays. The loading clamps expand and contract the length of the bays to accommodate loading and movement of the panels.

As used herein, a "joist" shall mean any elongate secondary structural member such as a beam, stud, joist, truss, or an engineered wood member. The panels may be conventional construction boards such as plywood, oriented strand board or other panels.

The joist feeder (22), upper panel feeder (30) and the lower panel feeder (40) may be formed by frame members of adequate structural strength to provide the rigidity the apparatus needs to support its contents and be transported (28). In one embodiment, the frame members may comprise metal beams. Positioning hooks (29) on the largely metal frame permit manipulation of the frame and positioning of the entire apparatus.

The structural member (10) is formed by sequentially attaching upper and lower panels to the joists in appropriate distance intervals. The forward edge (11) of the structural member (10) is defined by the first joist (13). The first joist (13) is pushed out by the joist feeder until the first joist hits a first barrier (52) which is mounted to a barrier arm (51) at each end of the joist feeder (22). The first barrier (52) is aligned with the installation position, as shown in FIG. 2.

Figure 4:
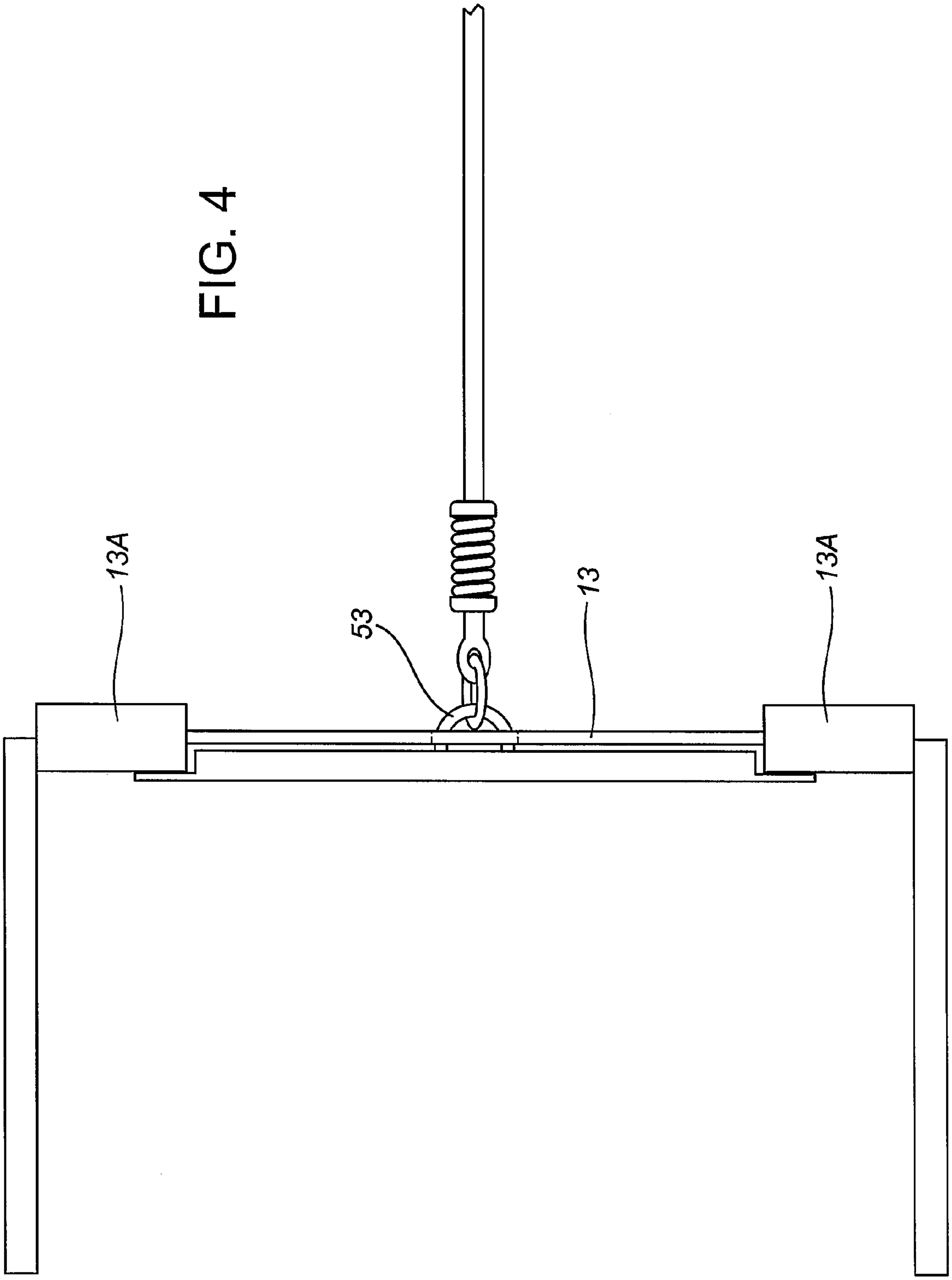
FIG. 4 is a side view of a flange hook.

In the installation position, an upper and a lower panel are pushed outward until they are aligned with the installation position and are attached to the first joist (13). The first joist (13) is attached by suitable means to a cable, actuated by a winch or other suitable means, which pulls the first joist (13). The cable may be attached to the first joist (13) by a flange hook (53) as is shown in FIG. 4. The flange hook is a member small enough in width and depth to be slid horizontally through precut holes in the joist and tall enough to contact the flanges (13A) of that joist thus transferring the pull force to the strongest part of the joist. The flange hook (53) may have a spring or shock absorber to mitigate the impact of sudden lateral forces on the structural member caused by the pulling force. This configuration helps prevent damage to the first joist by the horizontal pull force. It is also preferred that the flange hook (53) be centered on the first joist (13) so that the horizontal pull force is evenly applied to the structural member as it is being produced.

The first joist is supported vertically by a support structure (50) which extends out the distance of the structural member to be constructed. The support structure (50) may support the edges of the joist/panel combination, or may provide direct support underneath the structural member (10) and should preferably be a smooth low friction surface. The support structure is aligned with the bottom of the framing machine (1) such that the structural member moves onto the support structure as it is being formed.

Figure 5:
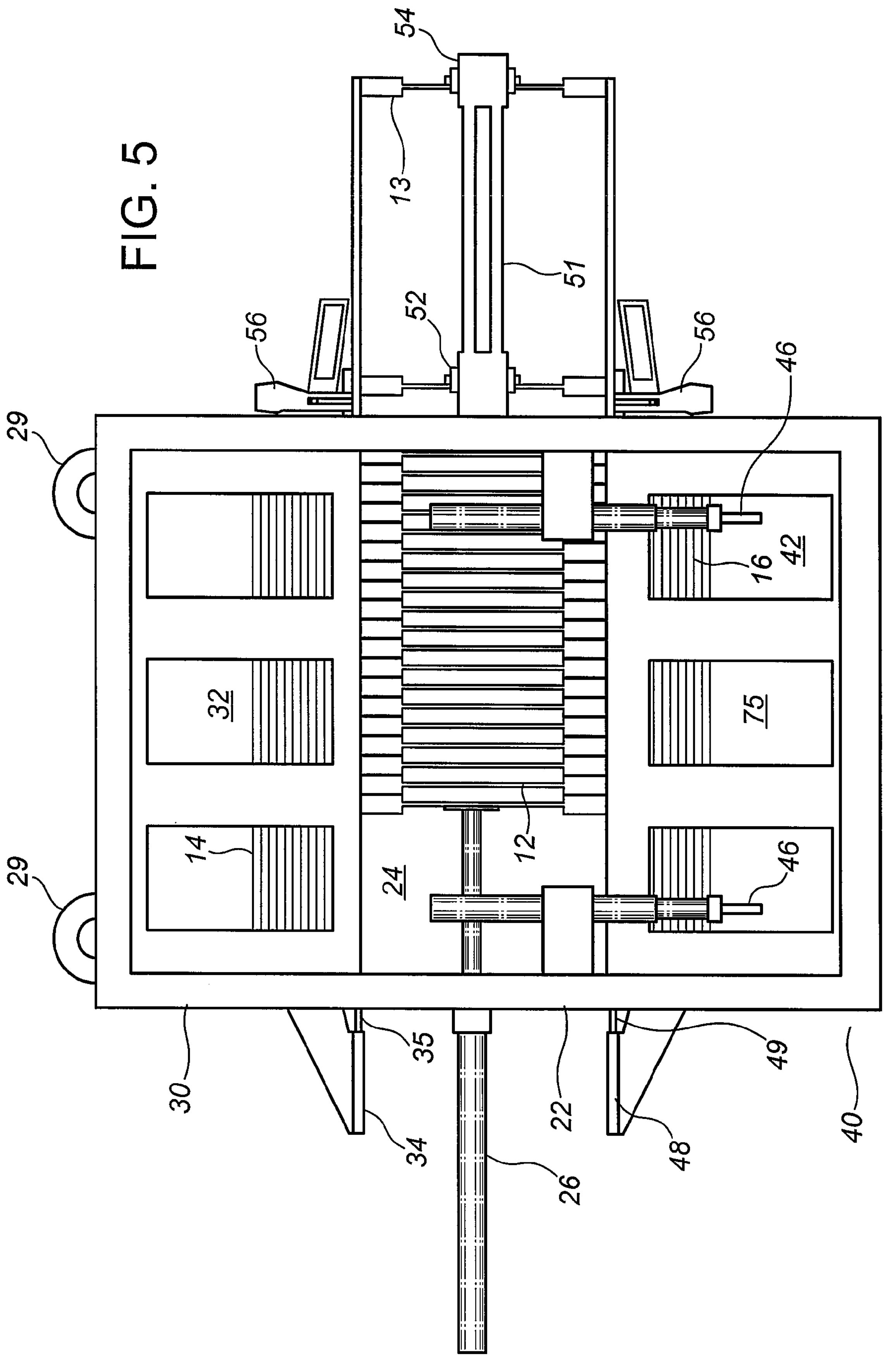
FIG. 5 is a side view of the framing machine shown in FIG. 2, showing assembly of a structural member.

As shown in FIG. 5, the first joist (13) is pulled away from the joist feeder (22), the attached upper and lower panels are also pulled in the same direction. As well, the arrayed joists are moved by the piston (26) outwards until the next joist reaches the first barrier (52), ensuring the joist occupies the installation position, where the first joist (13) started. The positioning barrier (52) may retract when necessary to allow joists to pass as assembly continues.

When the first joist (13) has reached a predetermined distance away from the installation position, the second joist is attached to the upper and lower panels. The predetermined distance may be measured by means of a second barrier (54) on the barrier arm (51). Obviously, the spacing between the first and second barriers (52, 54) determines the spacing between joists in the structural member. The second barrier is on a track allowing it to move to and from the first barrier, providing the ability to vary the distance between joists. The second barrier may take the form of an optical sensor which determines when the first joist has reached an appropriate spacing distance.

Figure 6:
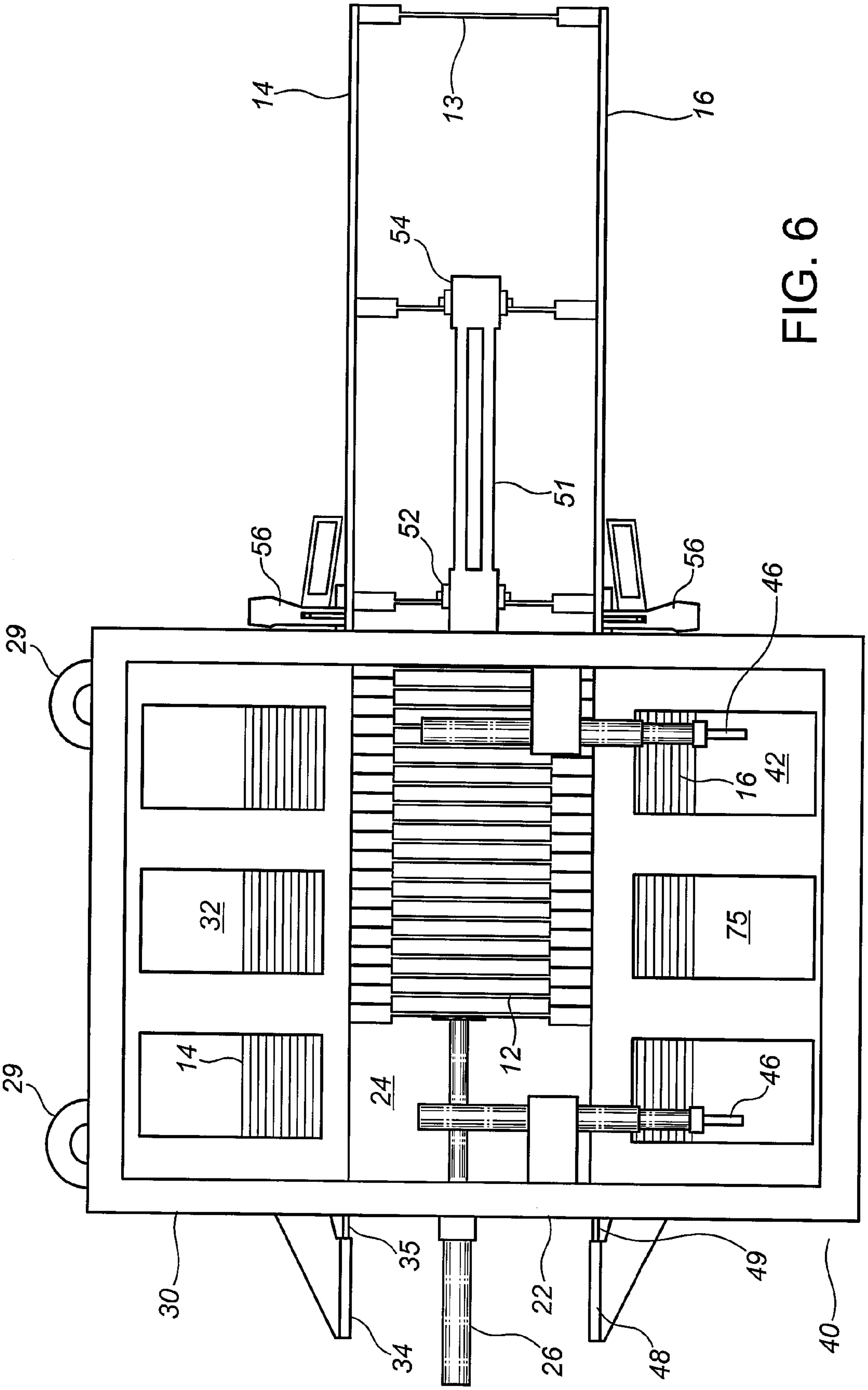
FIG. 6 is a side view similar to FIG. 5, showing further assembly of the structural member.

As shown in FIG. 6, the attachment of the upper and lower panels is repeated for each successive joist, as the structural member is extended by the pulling of the first joist. As the width of the first upper and lower panels clears the installation position, the next upper panel is pushed into place by the upper panel actuator, and the next lower panel is pushed into place by the lower panel actuator.

Figure 14:
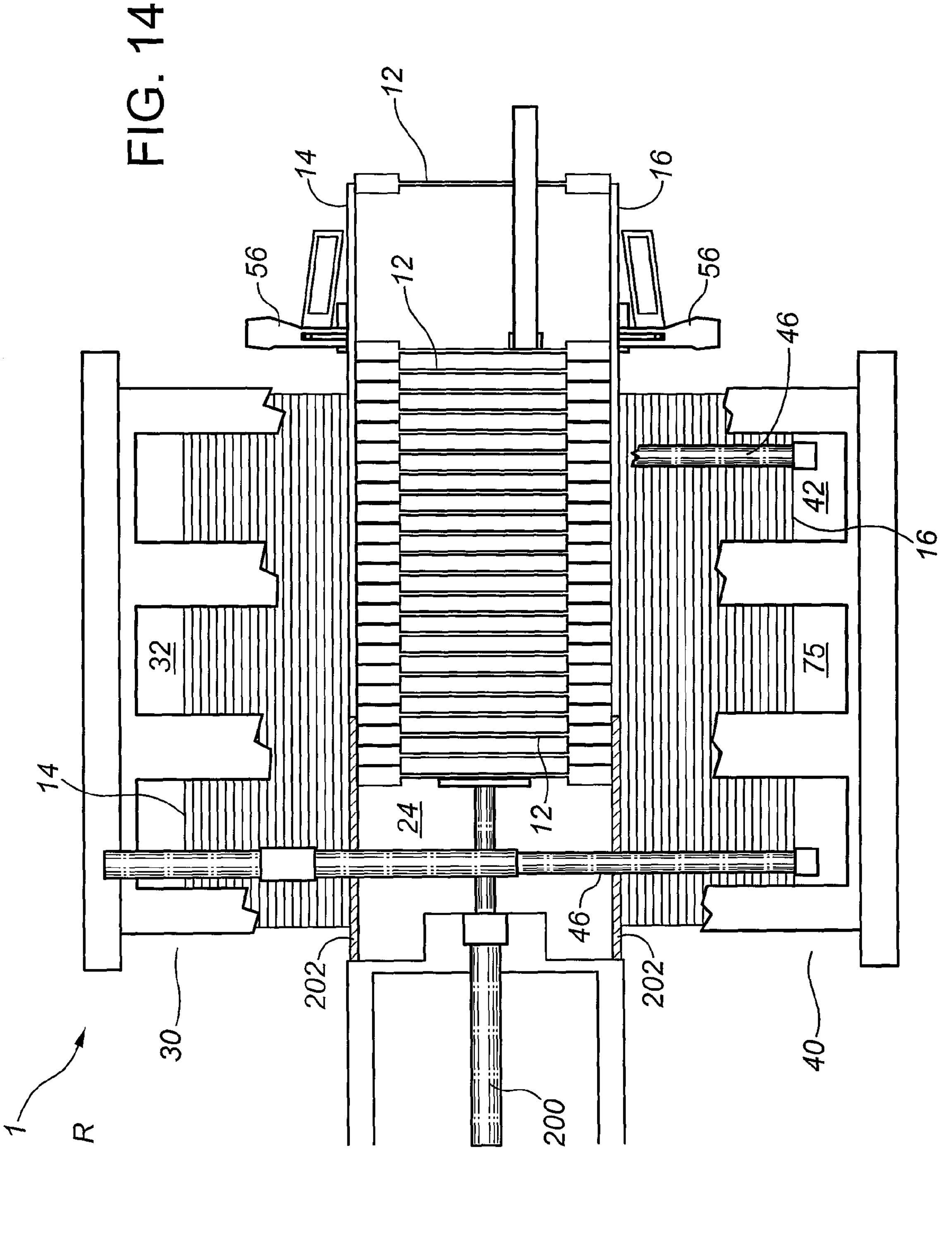
FIG. 14 shows an alternative embodiment of the framing machine utilizing a horizontal push force.

In an alternative embodiment, the horizontal force is applied as a push force. For example, as shown in FIG. 14, a horizontal ram (200) may be provided behind the joist array, and used to push the joists until the first or next joist is in the installation position and panel rams (202) are provided to push the upper and lower panels. Once the upper and lower panels are attached to the joist, a horizontal push force is applied to the upper and lower panels, which extends the assembly outwards.

Figure 15:
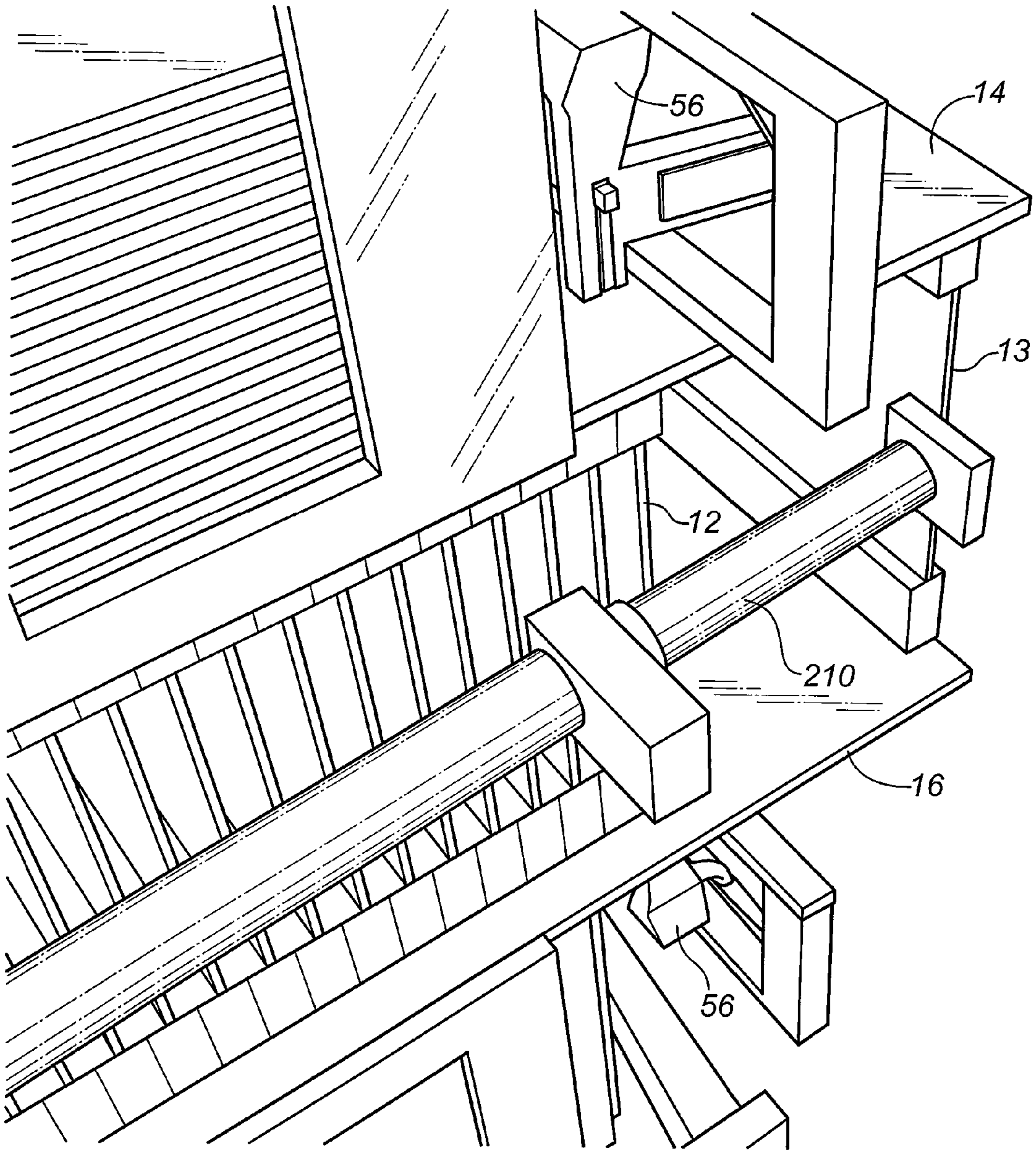
FIG. 15 shows an alternative push force mechanism.

In a further alternative embodiment, a horizontal push force may be applied to the first or next joist (13), as shown in FIG. 15. Horizontal rams (210) may be placed adjacent the joist array and act on the first or next joist (13).

Figure 7:
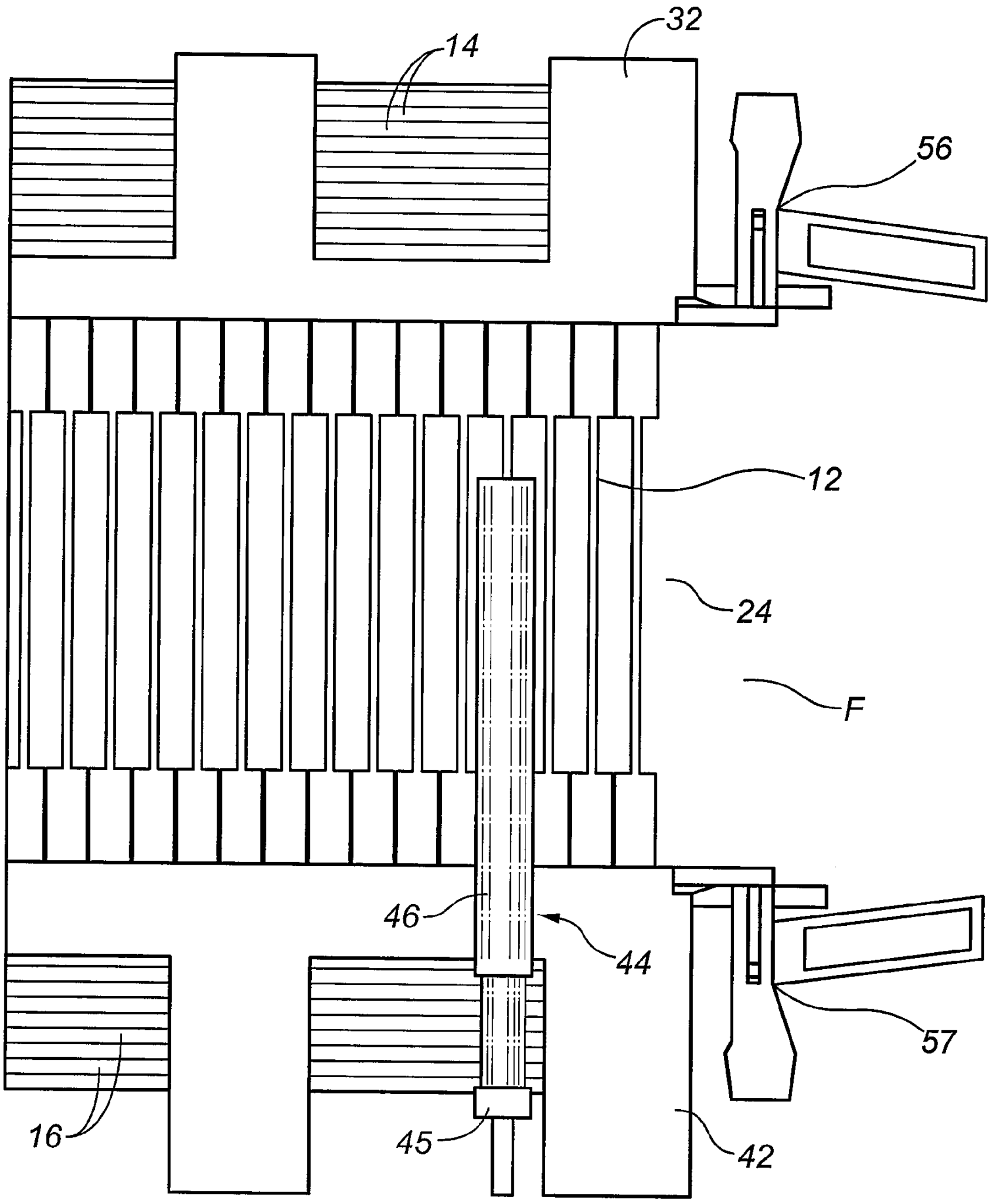
FIG. 7 is a view of the nailing guns and the installation position.

The fastening means for fastening the upper panels to the joists, and fastening means for nail fastening the lower panels to the joists comprise guns (56) or similar fastening devices positioned above and below the installation position, as shown in FIG. 7. Multiple fastener guns along the length of the joist may be provided, or alternatively, a single or reduced number of fastener guns which may be moved along the length of joist may be provided.

Figure 8:
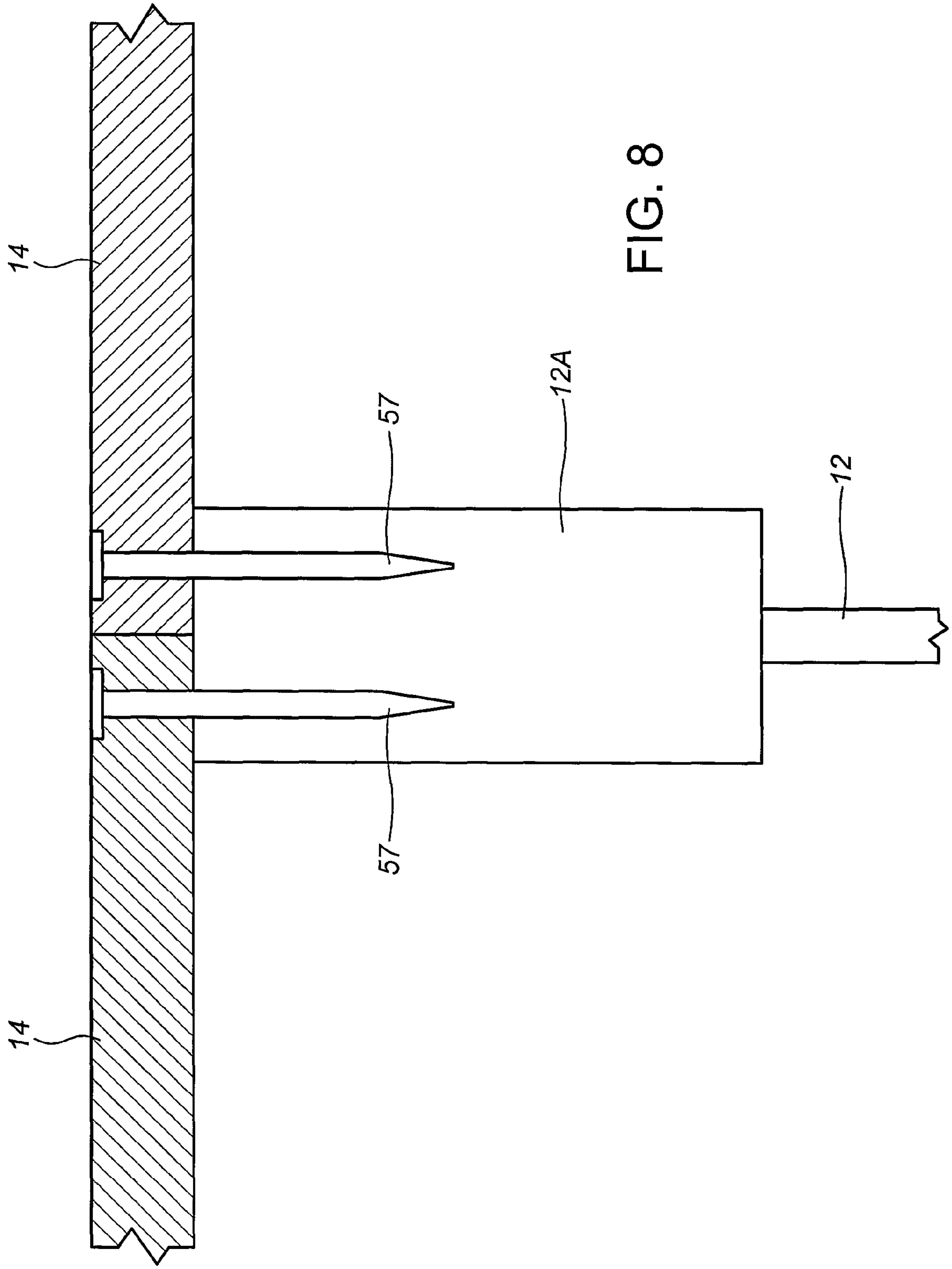
FIG. 8 is a cross-section view of a joint between adjacent upper panels and a joist.
Figure 8B:
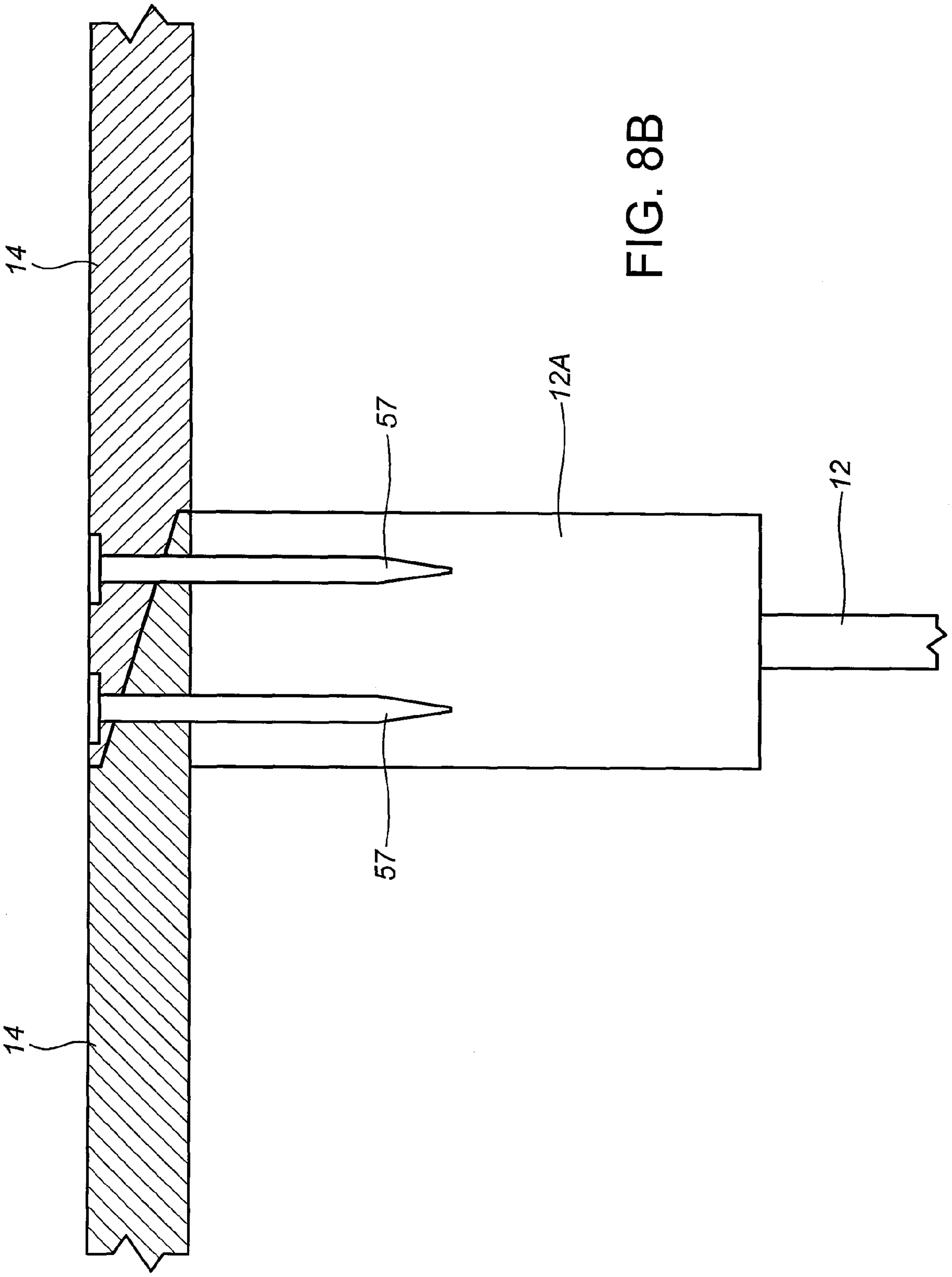
FIG. 8B is a cross-section view of an alternative configuration of the joint.

The width of the upper and lower panels is preferably equal to a multiple of the distance between two successive joists. For example, if standard 4'×8' panels are used, then the distance between joists may be 16" or 24". Accordingly, the seams between panels (14) will align with a joist, and both adjacent panels may be attached to the same joist, as is shown in FIG. 8A, where the nail fasteners (57) are also as shown. In an alternative embodiment, the joint between adjacent panels may be an overlapping joint, as is shown in FIG. 8B.

The process of assembly may be continuous, partially continuous or intermittent. If continuous, the pull speed must be sufficiently slow so as to allow fastening of the successive panels without misalignment. In an intermittent process, a sensor such as an optical sensor may measure the length of board that has passed signaling when the next joist must be connected and momentarily stop the pull force until fastening is complete. The intermittent process may allow the use of screw fasteners, adhesives or spot welding, which may require more time to complete the fastening process.

Figure 9:
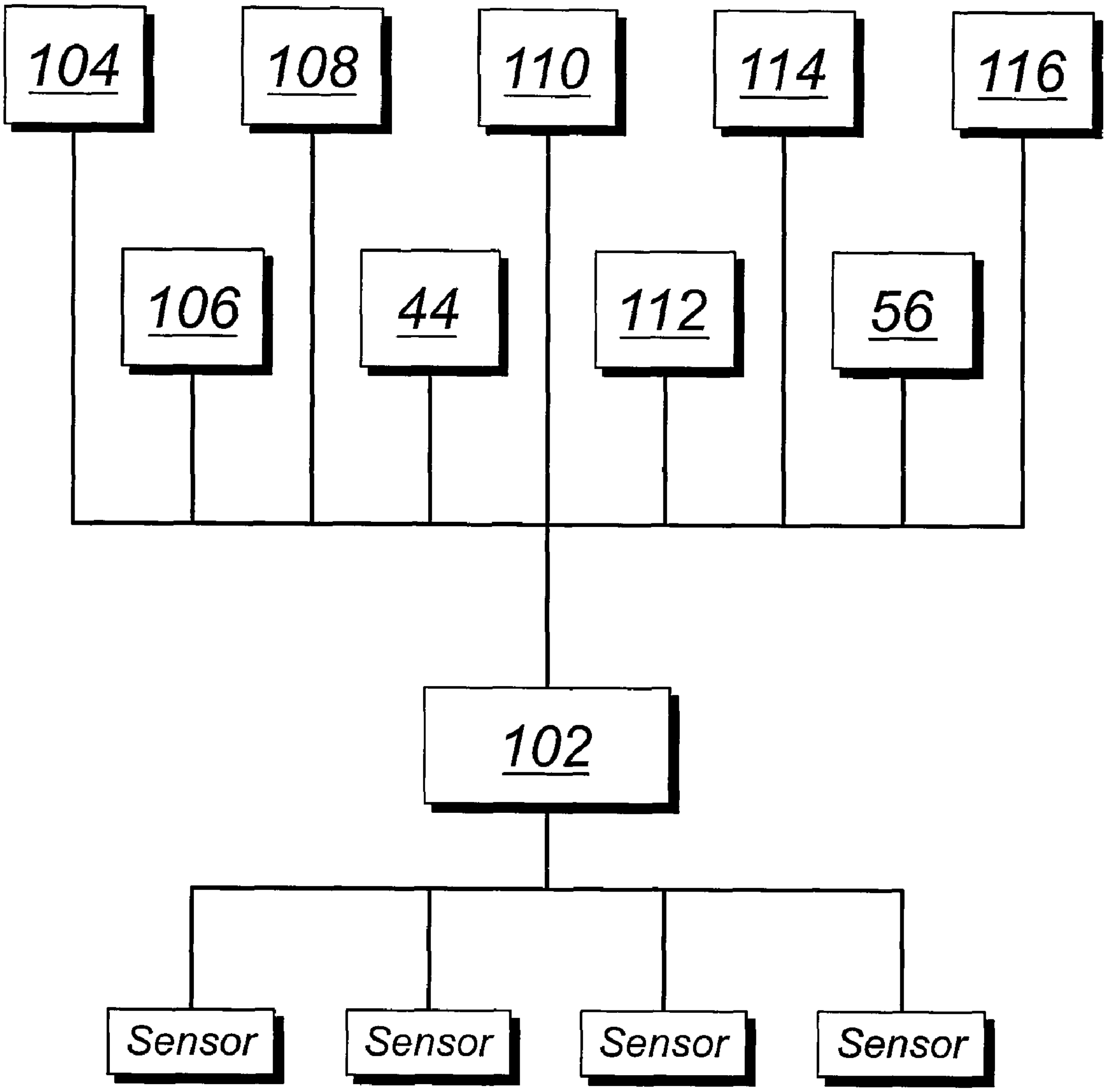
FIG. 9 is a schematic representation of a controller of the present invention.

The assembly process is preferably automated by means of a microprocessor operating a suitable algorithm or reading a software file that dictates the exact spacing of the joists in the structural member. The control system (100) shown in FIG. 9 comprises a plurality of sensors, which may be optical sensors, which sense and determine the position and movement of the upper and lower panels, the joists, and the assembled structural member, as required for the control algorithm. Therefore, in one embodiment, a processor (102) runs an appropriate control algorithm, and is connected to push force actuators (104), upper panel push actuators (106), lower panel push actuators (108), lower panel lift mechanism (44), primary barrier retraction and extending actuator (110), secondary barrier retraction and extending actuator (112), second barrier positioning track (114), the nailing gun array (56), and the pull force actuator (116) which may be a winch. Control of the actuators may be manually operated by a remote operator, or may be controlled by sensors which detect the positioning of various components of the system. For example, an optical sensor positioned to sense movement of one of the upper or lower panels as it is being pulled, will measure the distance traveled by the panels as they are being pulled. The sensor will activate the fasteners when the intended joist installation location passes between the fasteners (26) the algorithm will automatically replenish the installation position after each joist connection action by moving the next joist to abut the position barrier (52), in the installation position.

Figure 10:
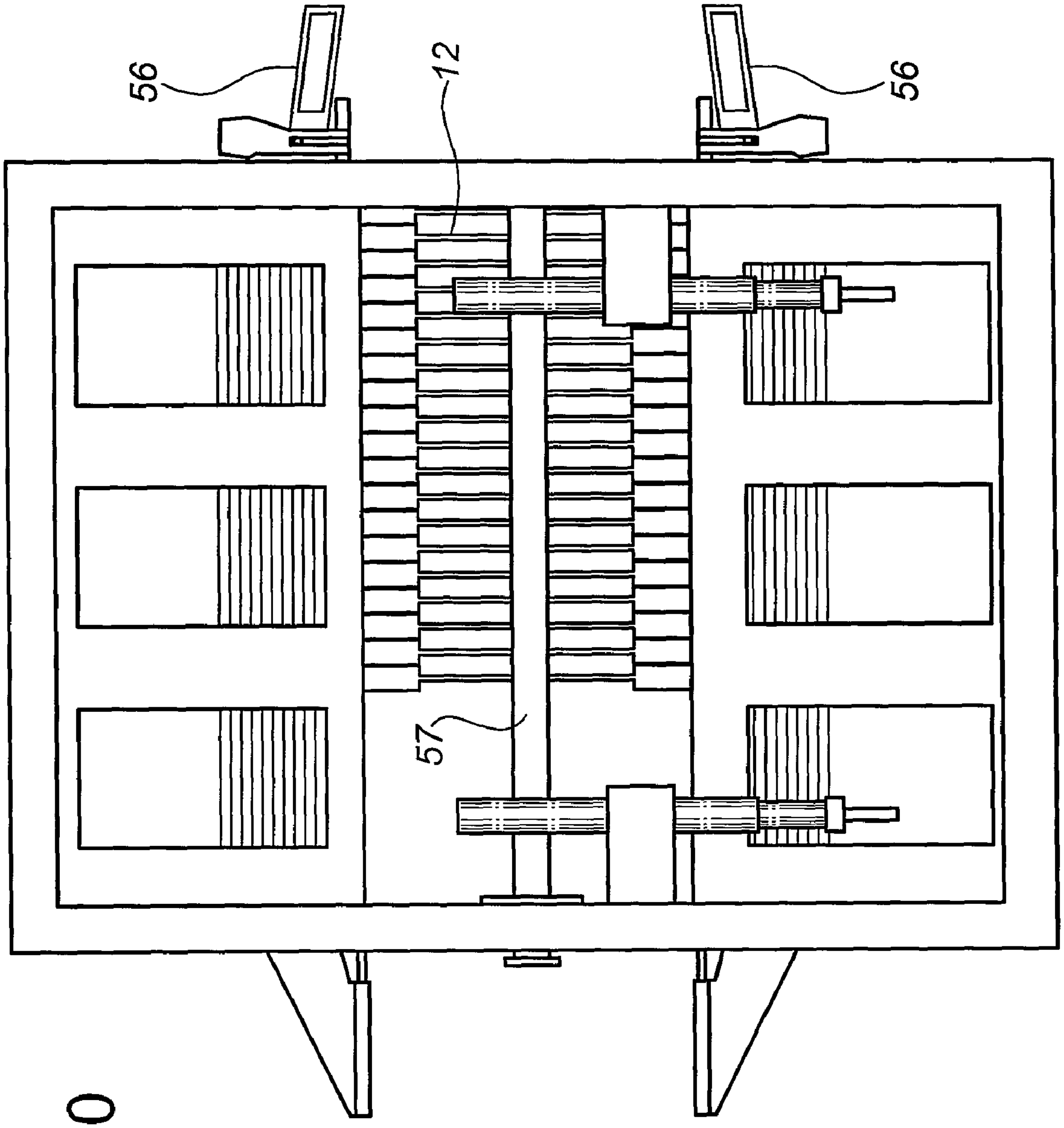
FIG. 10 is a side view of an internally supported joist array.
Figure 11:
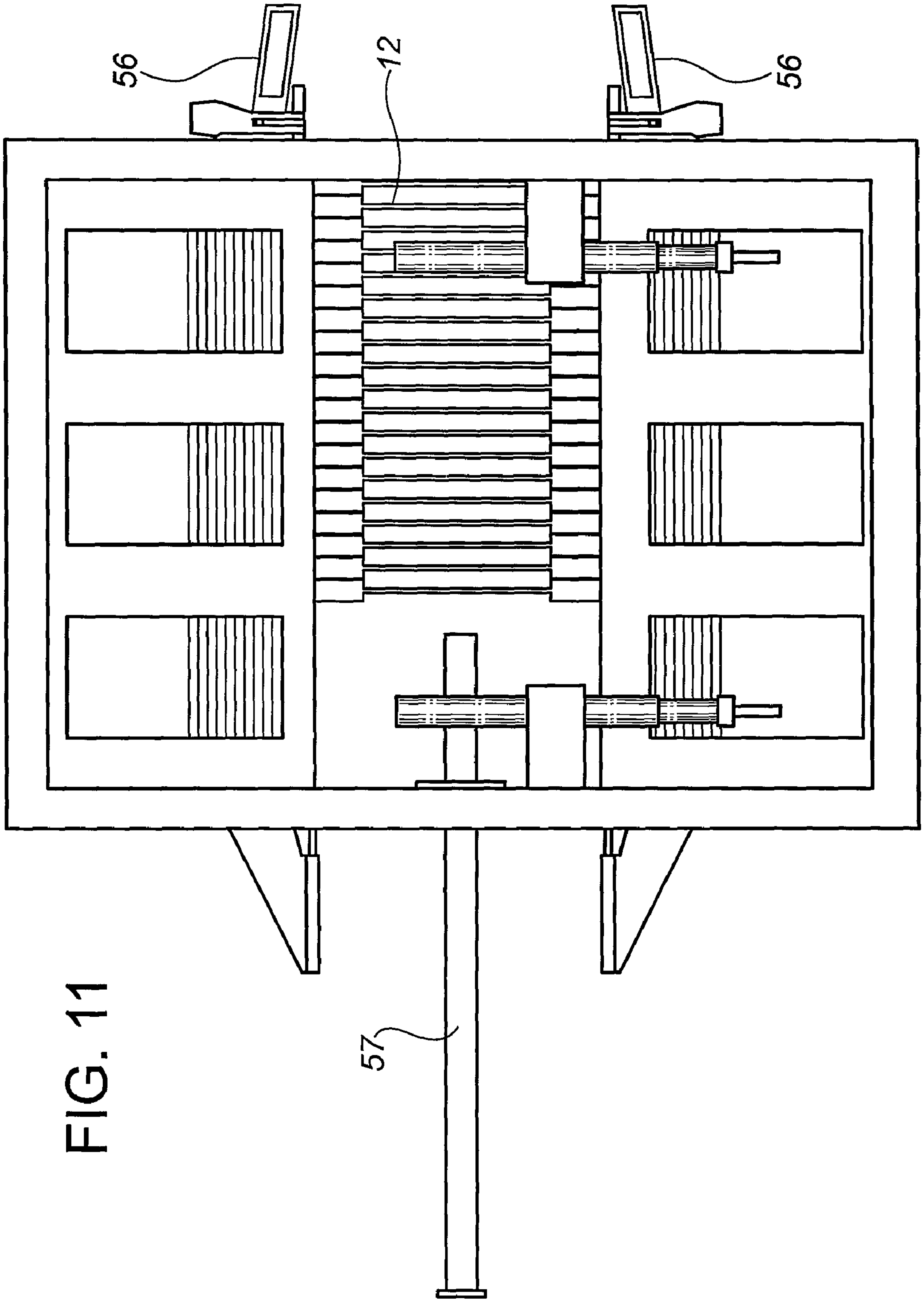
FIG. 11 is a side view of the internally supported joist array, with the internal support withdrawn.

The joist support rails (25) prevent the lower panels from extending right to the edge of a joist. Therefore, if it is desired that the panels extend past the joists or be flush with the joists, the joists cannot be supported within the joist bay from the underside. In this embodiment, the joists are supported internally by an internal support member (57) which extends horizontally through the joist bay and impales the joists, thereby suspending them within the joist bay, as is shown in FIG. 10. The internal support members may be retractable to facilitate loading of the joist bay, as is shown in FIG. 11.

Once a completed structural member (10) has been formed and rests on the support (50), another structural member may be formed on top of the existing structural member. In this case, smooth strips of a material may be placed on top of the existing structural member, to reduce friction between the two members as the second member is being formed.

Figure 17A:
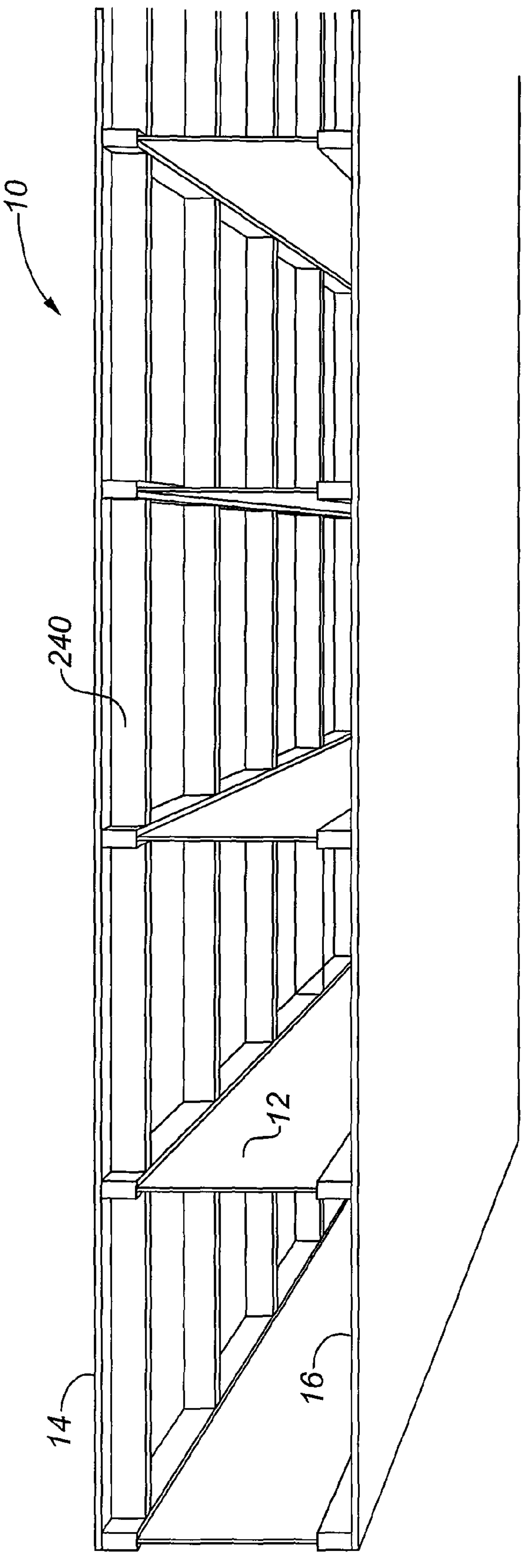
FIGS. 17A and 17B are views of a plurality of transverse joists fastened between an upper panel and a lower panel
Figure 17B:
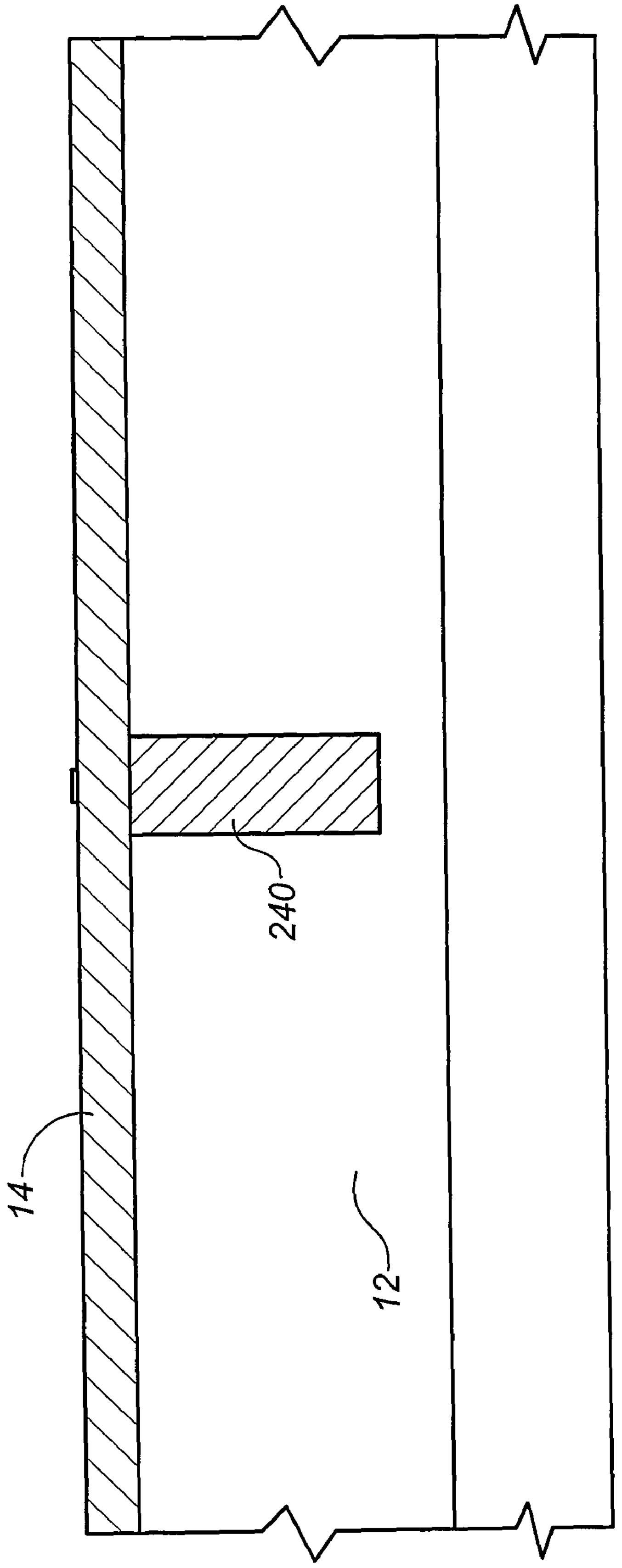

In one embodiment, longitudinal support members (240) may inserted perpendicularly to the joists, underneath the upper panel as shown in FIG. 17A, or above the lower panel, within the structural member (10). Gaps may be cut or formed in the upper (or lower) beam of the joist to permit such longitudinal support members to be inserted lengthwise into the structural member (10). The gaps may be formed by cutting gaps into the upper beam of a joist, or by attaching spaced apart gap forming pieces such as 1×1 lumber on top of the joist. In one embodiment, the height of the gap is slightly larger than the member (240) itself, allowing room for an adhesive material to be inserted during assembly. When the upper panel is attached to the member (240), as seen in FIG. 17B, a tight bond is created. If the structural member (10) is to be used as a floor member, the result will be a squeak free floor over the lifetime of the floor. The longitudinal support members may be formed of dimensional lumber, such as 2×4 or 1×4 lumber. They serve to stiffen the structural member (10) in the horizontal plane, transverse to the joists. The number of joists may be reduced while maintaining the same or similar structural strength of the panel.

In one embodiment, the framing machine (1) includes a system for inserting mechanical pipes and wires in the structural member (10) as it is being assembled. The lines and wires may include plumbing, HVAC ducts, electrical wires or any other duct, tube or wire-like material that is normally placed within walls or floors of a conventional building. In one embodiment, the wires and pipes (60) are coiled on spools (62) or in boxes at the rear of the apparatus and each is fed through holes or openings in the arrayed joists and connected to the first joist. Thus, as the first joist is pulled in the assembly process, the wires and pipes will be pulled along and threaded through all of the joists in the structural member. In an alternative embodiment, the line materials are placed on the structural member largely in front of the first joist, threaded through the arrayed joists and connected to the last joist, or an anchor point on or near the apparatus. The line materials are then moved along with the first joist as it is pulled, thus accomplishing the same result. In an alternative embodiment, the line materials are placed on the front side of the framing machine, threaded through the arrayed joists and connected to the last joist, or an anchor point on the apparatus thus accomplishing the same result. In another alternative embodiment the line materials are placed on the rear of the machine and threaded through the arrayed joists but not connected to the structural member, the line materials are laid in the structural member as it is being produced by an active mechanism such as opposed wheels.

Figure 12A:
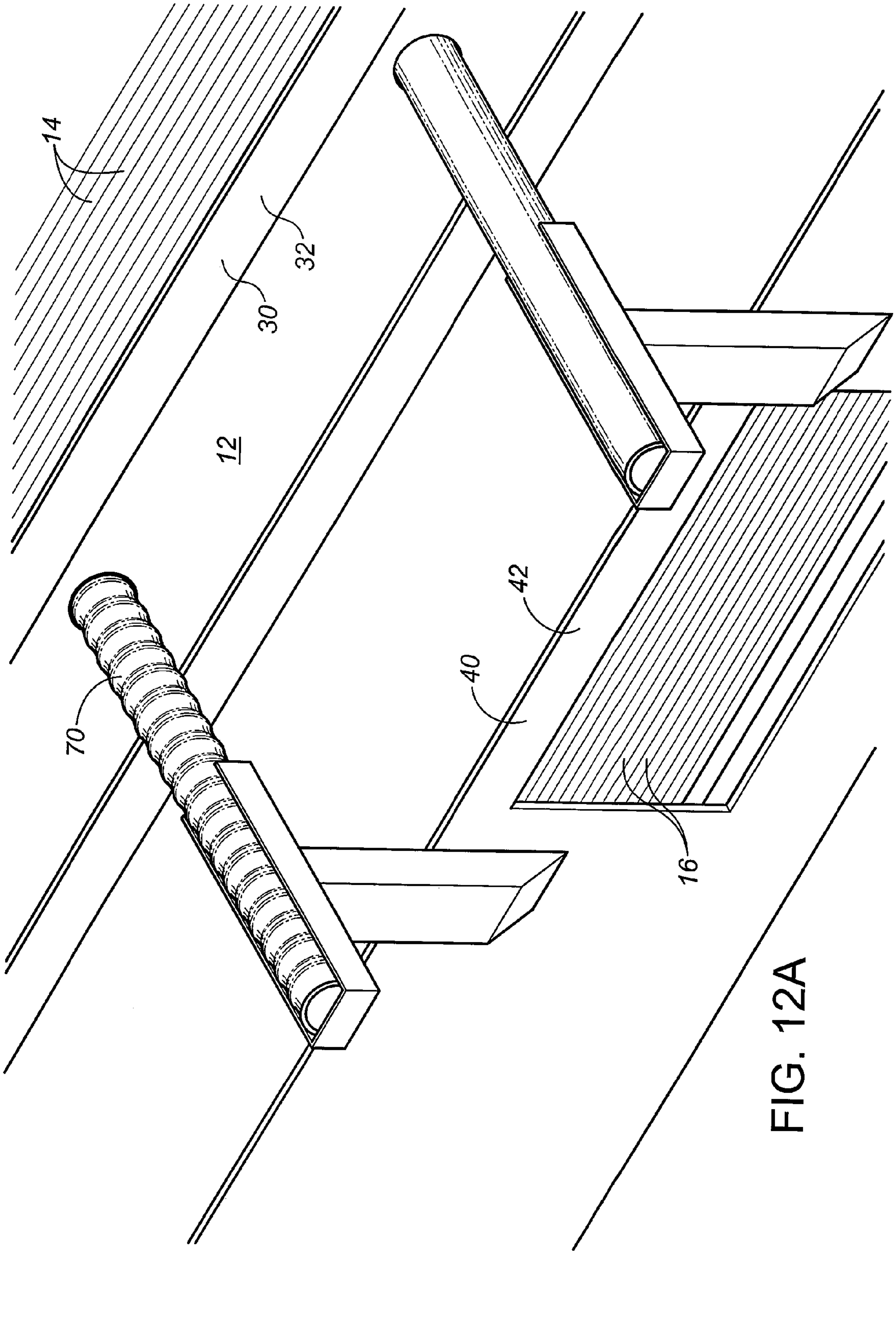
FIGS. 12A and 12B show the flexible tube for installing insulation.
Figure 12B:
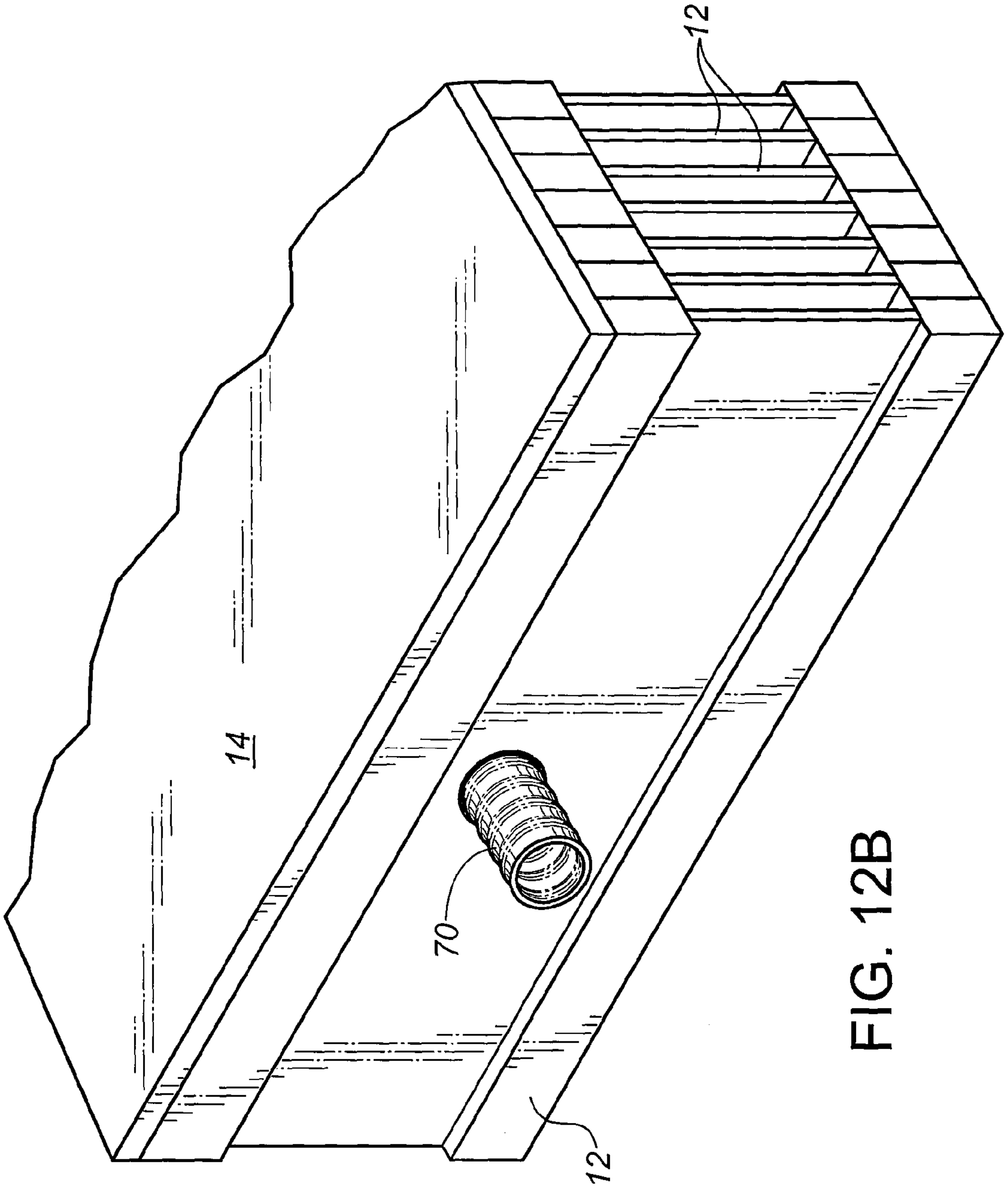
Figure 12C:
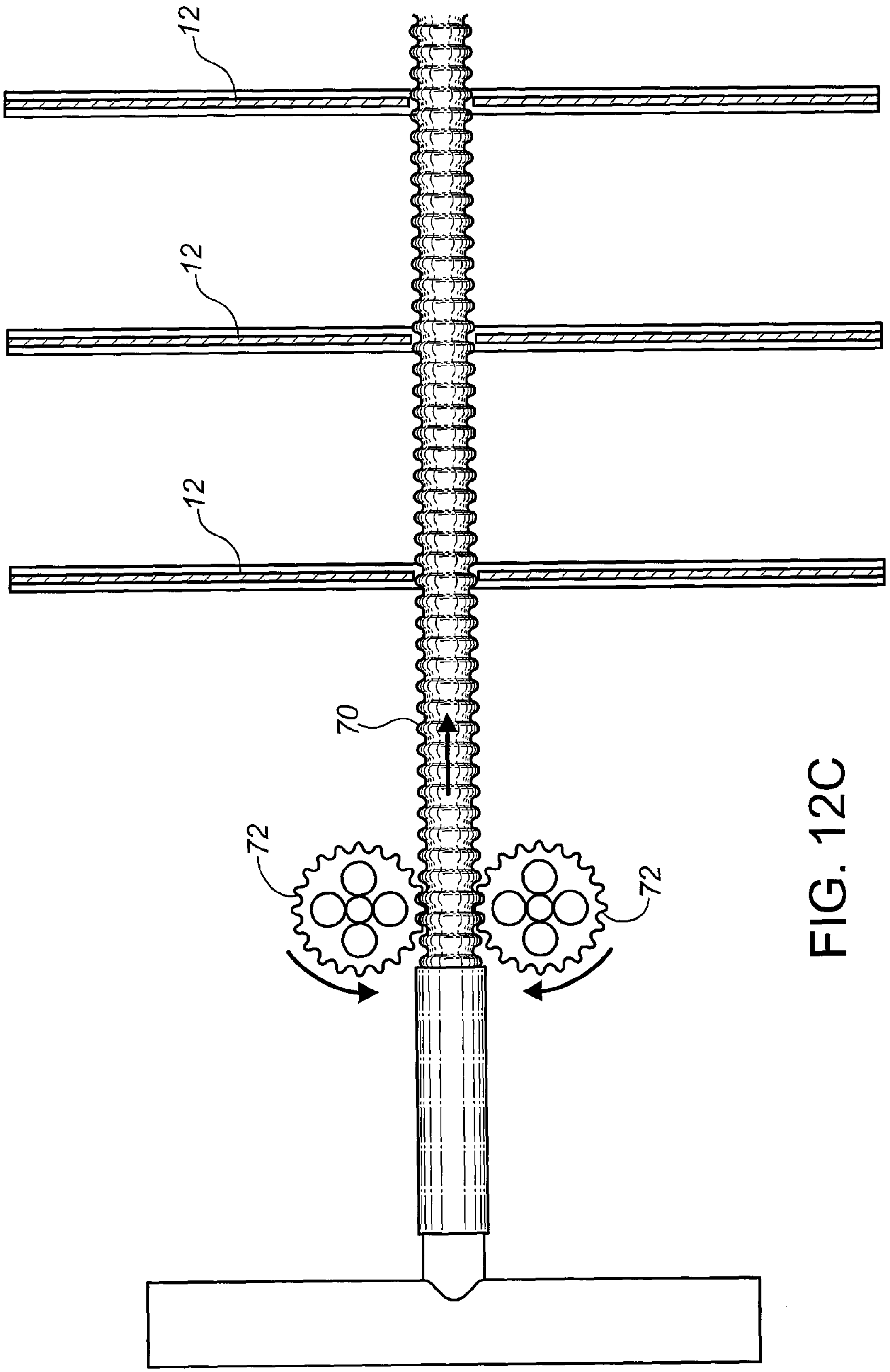
FIG. 12C shows a gear mechanism for retracting the flexible tube.

In one embodiment, illustrated in FIGS. 12A-12C, means for insulating the structural member is provided. As the structural member is being produced, a flexible tube (70) is inserted through precut holes in the joists, or through openings in trusses. The flexible tube (70) may be attached to the first joist (13) and pulled through the arrayed joists in like manner to the wires and pipes referred to above. When the structural member is complete insulation material may be blown into the structural member through the flexible tube (70). The tube (70) may be withdrawn from each successive joist to fill each space created between adjacent joists with insulation. In one embodiment, the tube may be a compressible corrugated tube, which is actuated by an opposed pair of sprockets (72) having teeth matching the corrugations. Rotation of the sprockets will then cause retraction of the tube.

Figure 13A:
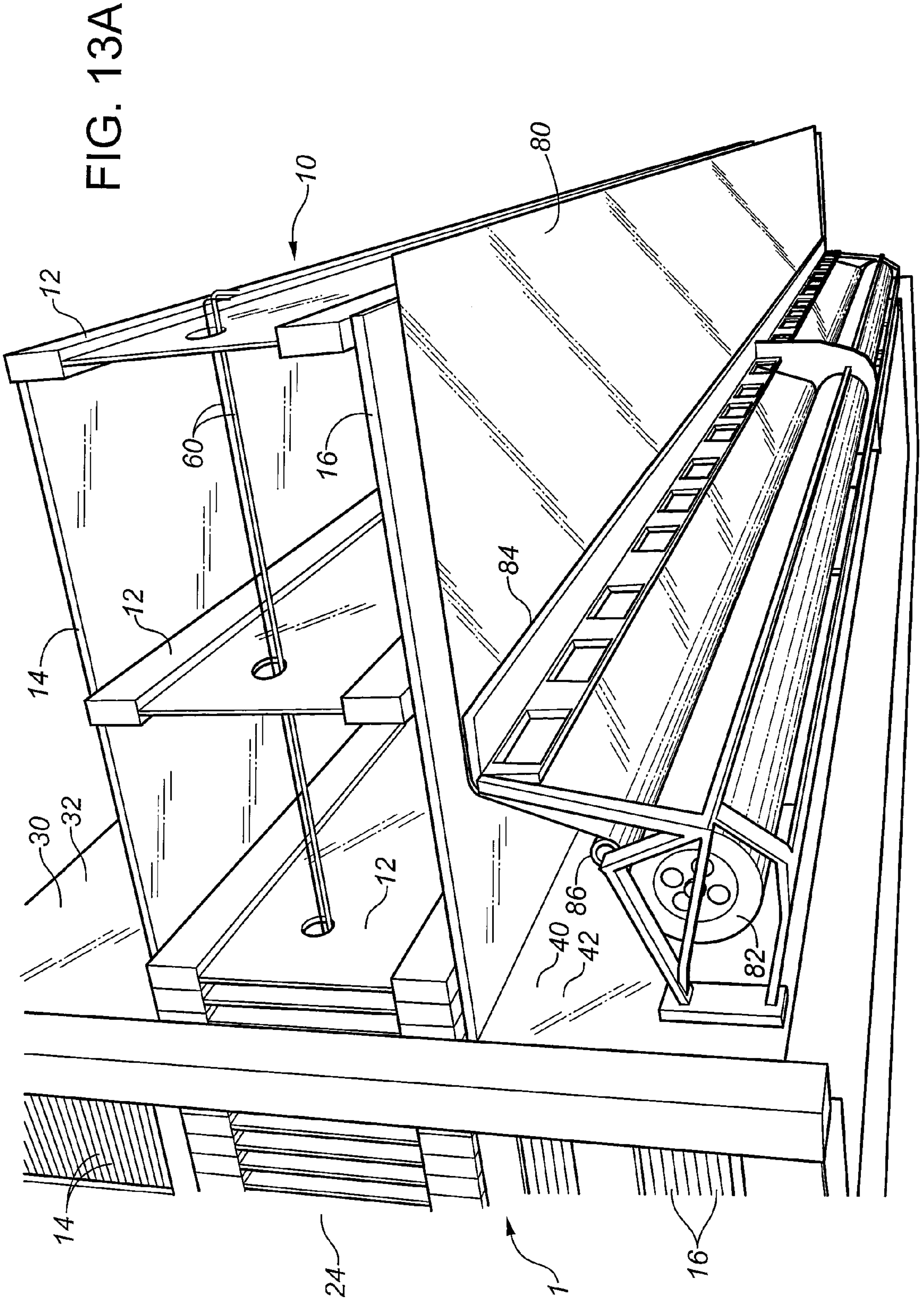
FIGS. 13A and 13B show an exterior finish or vapour barrier installation system.
Figure 13B:
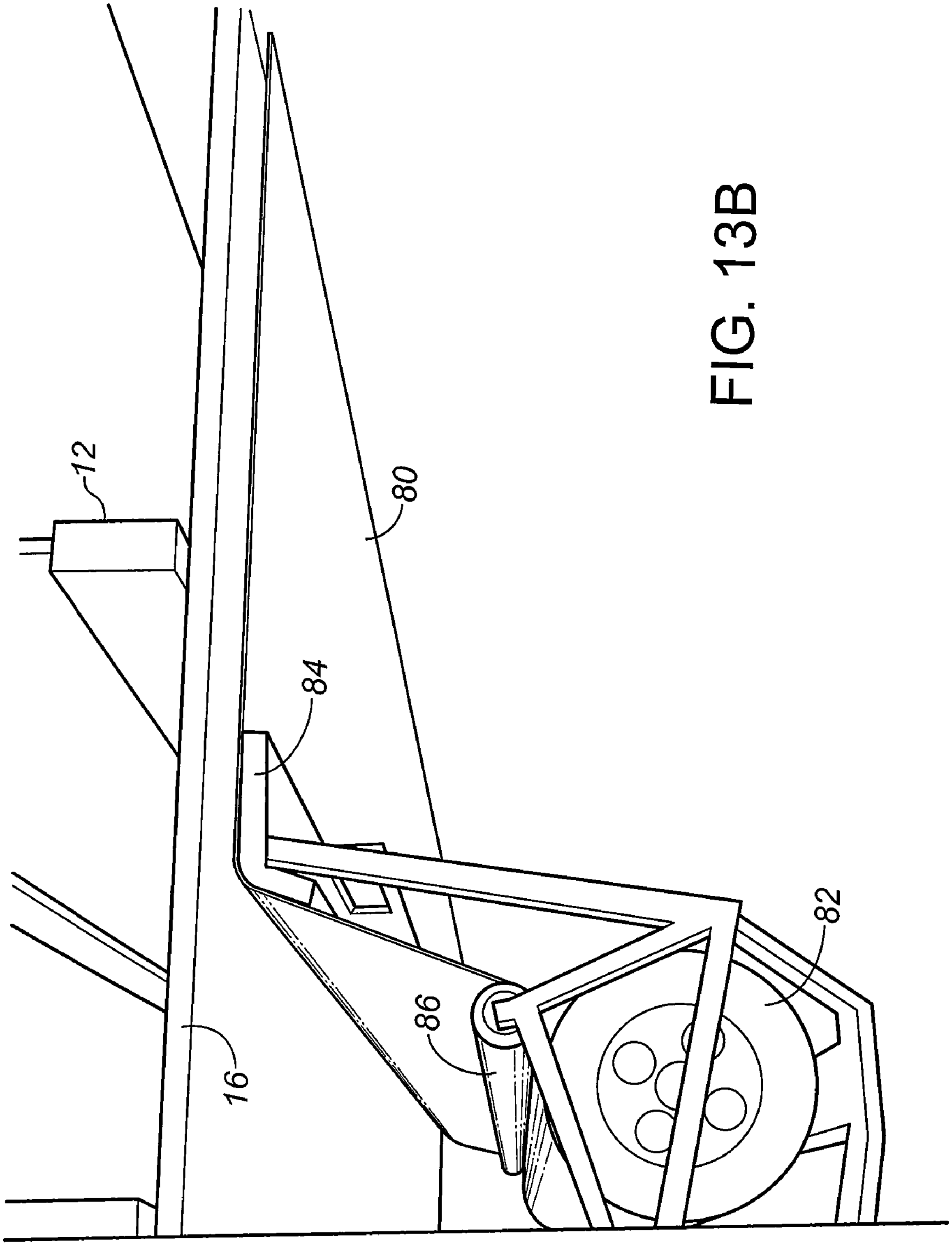

In one embodiment, shown in FIGS. 13A and 13B, a finish application or vapour barrier system may be included. A finish material (80) such as linoleum, or other sheet material may be applied at the same time the structural member (10) is assembled. The sheet material may provide a vapour barrier, sound deadening, fire resistance, aesthetic appeal, or other desirable properties to the structural member. In one embodiment, the finish material is provided on a roll (82) above the upper panels, or below the lower panels. The finish material passes between the panel and an applicator blade (84), which presses the material against the panel. A glue applicator such as an elongate porous roller (86) is positioned directly above and in contact with the roll of material and is thus supported by the roll while it applies adhesive material to the finish material before it comes off the roll, or the glue applicator is positioned in front of the fasteners and applies glue to the surface of the boards.

Alternatively, rolled barrier material may be provided at the rear of the framing machine and placed between the joists and the lower panels or the upper panels. The barrier material is then fastened to the joists and the panels as the structural member is assembled and moved out of the machine.

What is claimed is:

1. An apparatus for automating building construction by assembling a structural member in an assembly direction, comprising:

(a) a joist feeder including a joist bay for holding a plurality of vertical joists, horizontally arrayed, wherein the joists are transverse to the assembly direction, and means for forcing the plurality of joists horizontally;

(b) an upper panel feeder, positioned above the joist feeder, comprising a panel bay for holding a plurality of horizontal panels, vertically arrayed;

(c) a lower panel feeder, positioned below the joist feeder, comprising a panel bay for holding a plurality of horizontal panels, vertically arrayed, and including means for forcing the lower panel array upwards, (d) pull means for pulling a first joist away from the joist feeder in the assembly direction;

(e) fastening means for fastening the upper panels to the joists, and fastening means for fastening the lower panels to the joists;

(f) alignment means for positioning each successive joist in alignment with the panel fastening means; and (g) means for aligning each successive upper panel and each successive lower panel with the joist aligned with the fastening means;

such that the resulting structural member comprises a plurality of transverse joists fastened between an upper panel and a lower panel.

2. The apparatus of claim 1 further comprising means for applying an exterior or interior finish to the produced product.

3. The apparatus of claim 2 further comprising means for applying a vapor barrier to the produced product.

4. The apparatus of claim 1 further comprising means for threading mechanical lines into the structural member as it is being formed.

5. The apparatus of claim 1 further comprising means for inserting an insulating system into the structural member as it is being formed.

* * * * *